US00RE47205E

(19) United States
(12) Reissued Patent
Hill

(10) Patent Number: US RE47,205 E
(45) Date of Reissued Patent: Jan. 15, 2019

(54) RELATIONSHIP AND SECURITY IN ONLINE SOCIAL AND PROFESSIONAL NETWORKS AND COMMUNITIES

(71) Applicant: TIMEDRIGHT INC., Toronto (CA)

(72) Inventor: David William Hill, Toronto (CA)

(73) Assignee: TimedRight Inc., Toronto

(21) Appl. No.: 14/608,764

(22) Filed: Jan. 29, 2015

Related U.S. Patent Documents

Reissue of:
(64) Patent No.: 8,364,753
Issued: Jan. 29, 2013
Appl. No.: 13/223,947
Filed: Sep. 1, 2011

U.S. Applications:
(63) Continuation of application No. 12/619,451, filed on Nov. 16, 2009, now abandoned.
(Continued)

(51) Int. Cl.
*G06F 15/16* (2006.01)
*G06F 15/173* (2006.01)
(Continued)

(52) U.S. Cl.
CPC ..... *G06Q 10/10* (2013.01); *H04L 29/08684* (2013.01); *H04L 63/104* (2013.01); *H04W 4/21* (2018.02)

(58) Field of Classification Search
CPC ..... G06Q 10/10
(Continued)

(56) References Cited

U.S. PATENT DOCUMENTS 7,647,256 B2 * 1/2010 Burch ..... G06F 17/30575 705/29
7,685,016 B2 * 3/2010 Flores ..... G06Q 10/06 705/7.11
(Continued)

FOREIGN PATENT DOCUMENTS

WO WO 9923577 A1 * 5/1999

OTHER PUBLICATIONS

Written Opinion of the International Searching Authority dated Dec. 8, 2010 issued from the Canadian Intellectual Property Office relating to PCT International Application No. PCT/CA2010/001216.

(Continued)

*Primary Examiner* — Angela M Lie
(74) *Attorney, Agent, or Firm* — Grant Tisdall

(57) ABSTRACT

A method is provided for evolving a defined online existing relationship between a first member and a second member, the online existing relationship defined by a plurality of existing relationship features for use in managing network interaction on a communications network between the first member and the second member. The method comprising: receiving a new online relationship having new relationship features such that the new features are different from the existing relationship features, the new relationship features being characteristic of the new relationship; aggregating the existing relationship features and the new relationship features as aggregate relationship features a combination of the existing relationship features and the new relationship features in order to define an aggregate relationship; storing the aggregate relationship features in a storage as relationship data; and accessing the relationship data in order to determine whether a selected network interaction from one of the members is permitted.

43 Claims, 16 Drawing Sheets

Related U.S. Application Data

(60) Provisional application No. 61/272,010, filed on Aug. 6, 2009.

(51) Int. Cl.

| | |
|---|---|
| ***G06Q 10/10*** | (2012.01) |
| ***H04L 29/06*** | (2006.01) |
| ***H04W 4/21*** | (2018.01) |
| ***H04L 29/08*** | (2006.01) |

(58) Field of Classification Search
USPC ..... 709/203, 223
See application file for complete search history.

(56) References Cited

U.S. PATENT DOCUMENTS

| | | | | |
|---|---|---|---|---|
| 8,010,619 | B1 * | 8/2011 | Lawler et al. | 709/217 |
| 8,078,682 | B1 * | 12/2011 | Worley | G06Q 30/02 709/206 |
| 8,117,253 | B2 * | 2/2012 | Robinson | G06Q 50/22 340/5.52 |
| 8,180,807 | B2 * | 5/2012 | Gorti | G06Q 30/02 705/319 |
| 8,392,357 | B1 * | 3/2013 | Zou | H04L 51/12 707/602 |
| 8,849,862 | B2 * | 9/2014 | Visscher | G06Q 10/06 705/7.12 |
| 9,015,597 | B2 * | 4/2015 | Pearson | G06Q 10/10 715/743 |
| 9,183,599 | B2 * | 11/2015 | Zuckerberg | G06Q 10/10 |
| 9,253,183 | B2 * | 2/2016 | Nathan | H04L 63/08 |
| 2005/0159970 | A1 * | 7/2005 | Buyukkokten et al. | 705/1 |
| 2005/0171799 | A1 * | 8/2005 | Hull et al. | 705/1 |
| 2007/0038594 | A1 | 2/2007 | Goodwin et al. | |
| 2007/0130351 | A1 * | 6/2007 | Alperovitch et al. | 709/229 |
| 2008/0040370 | A1 | 2/2008 | Bosworth et al. | |
| 2008/0175266 | A1 * | 7/2008 | Alperovitch et al. | 370/465 |
| 2008/0222295 | A1 | 9/2008 | Robinson et al. | |
| 2008/0228768 | A1 | 9/2008 | Kenedy et al. | |
| 2008/0275899 | A1 | 11/2008 | Baluja et al. | |
| 2009/0024747 | A1 | 1/2009 | Moses et al. | |
| 2009/0144075 | A1 | 6/2009 | Flinn et al. | |
| 2010/0198742 | A1 | 8/2010 | Chang et al. | |
| 2010/0205066 | A1 | 8/2010 | Ho et al. | |
| 2010/0235886 | A1 * | 9/2010 | Muller et al. | G06Q 30/02 726/4 |
| 2011/0125661 | A1 * | 5/2011 | Hull et al. | 705/319 |

OTHER PUBLICATIONS

International Preliminary Report on Patentability dated Feb. 7, 2012 issued from the International Bureau of WIPO relating to PCT International Application No. PCT/CA2010/001216.

International Search Report dated Dec. 8, 2010 issued from the Canadian Intellectual Property Office relating to PCT International Application No. PCT/CA2010/001216.

Chinese Office Action dated Jan. 30, 2014 issued from the State Intellectual Property Office relating to Chinese Patent Application No. 201080041686.9.

Chinese Office Action dated Oct. 14, 2014 issued from the State Intellectual Property Office relating to Chinese Patent Application No. 201080041686.9.

* cited by examiner

RELATIONSHIP AND SECURITY IN ONLINE SOCIAL AND PROFESSIONAL NETWORKS AND COMMUNITIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

This application is a *Reissue Application of Continuation U.S. Pat. No. 8,364,753 issued on Jan. 29, 2013, which is a* continuation of earlier filed non-provisional application having U.S. application Ser. No. 12/619,451 filed 11/16/2009, [now abandoned] which in turn claims priority to U.S. Provisional Patent Application No. 61/272,010 filed 08/06/2009 [and all of which is], *the contents of which are* incorporated herein [by reference] *in their entirety*.

FIELD OF THE INVENTION

This invention relates to configuration of networked entities for coordination of interaction between the networked entities.

BACKGROUND OF THE INVENTION

In today's multifaceted society, there are a number of industries (e.g. healthcare) that can be characterized as having a particularly fragmented workforce—in healthcare from physicians to nurses to practice administrators—that are extremely busy in their day to day activities. Day to day work for individuals in today's industries can be highly irregular and unpredictable, and with so many different parts working in isolation there are limited opportunities for people to be exposed to one another. Further, with few networks supporting these people or groups in reaching out and connecting with each other, it's easy for them to become isolated. All of this makes it very difficult for industry professionals to get in touch with who they want when they need to, to stay in touch with colleagues and co-workers within and/or between different industries, and to coordinate productive interactions with each other.

Social and professional networking is valuable to business professionals and healthcare professionals of all types. When people become members of social and professional online networks, they need to connect with other members in order to share information with, interact with, and network through those members. In cases where people are connecting to business professionals, business relationships are important and need to be entered into with care. Each relationship is different, each relationship has a level of trust, and people do not want to connect online with each of their professional contacts in the same way. Ultimately, it's not a one size fits all world when it comes to connecting online and the representation electronically (i.e. online) of the mixture of real world business and professional relationships is problematic using today's electronic relationship models.

Accordingly, in the current one size fits all world, a system is needed that enables community members to connect with their business connections in a way that represents their multifaceted life with the plurality of other members in the community (both known and unknown to the community member) because the members do not want to share the same information, communicate and interact in the same way, nor enable people to network through them in the same way, in view of real-world relationships. An example of this is that not everyone is "best" friends with every other person they have met in their real-world life. There are varying degrees of friendship/acquaintance in the real-world and there is a need to represent this in the online/electronic forum, amongst other possible types of relationships between people.

SUMMARY OF THE INVENTION

It is an object of the present invention to provide an benefit and rule configuration environment to obviate or mitigate at least some of the above-presented disadvantages.

In the current one size fits all world, a system is needed that enables community members to connect with their business connections in a way that represents their multifaceted life with the plurality of other members in the community (both known and unknown to the community member) because the members do not want to share the same information, communicate and interact in the same way, nor enable people to network through them in the same way, in view of real-world relationships. An example of this is that not everyone is "best" friends with every other person they have met in their real-world life. There are varying degrees of friendship/acquaintance in the real-world and there is a need to represent this in the online/electronic forum, amongst other possible types of relationships between people. One method is provided for evolving a defined online existing relationship between a first member and a second member, the online existing relationship defined by a plurality of existing relationship features for use in managing network interaction on a communications network between the first member and the second member. The method comprising: receiving a new online relationship having new relationship features such that the new features are different from the existing relationship features, the new relationship features being characteristic of the new relationship; aggregating the existing relationship features and the new relationship features as aggregate relationship features a combination of the existing relationship features and the new relationship features in order to define an aggregate relationship; storing the aggregate relationship features in a storage as relationship data representing, the aggregate relationship defined by the relationship features; and accessing the relationship data in order to determine whether a selected network interaction from one of the members is permitted in view of at least one of the corresponding aggregate relationship features of the aggregate relationship, and facilitating the selected network interaction between the members when determined as permitted; wherein said at least one of the corresponding aggregate relationship features of the aggregate relationship is used to define as permitted at least one of the network interaction type, the network interaction content, or the network interaction format.

A first aspect of the present invention provided is a method for evolving a defined online existing relationship between a first member and a second member, the online existing relationship defined by a plurality of existing relationship features for use in managing network interaction on a communications network between the first member and the second member, the method comprising the steps of: receiving a new online relationship having new relationship features such that the new features are different from the existing relationship features, the new relationship features being characteristic of the new relationship; aggregating the existing relationship features and the new relationship features as aggregate relationship features a combination of the existing relationship features and the new relationship features in order to define an aggregate relationship; storing the aggregate relationship features in a storage as relationship data representing the aggregate relationship defined by the relationship features; and accessing the relationship data in order to determine whether a selected network interaction from one of the members is permitted in view of at least one of the corresponding aggregate relationship features of the aggregate relationship, and facilitating the selected network interaction between the members when determined as permitted; wherein said at least one of the corresponding aggregate relationship features of the aggregate relationship is used to define as permitted at least one of the network interaction type, the network interaction content, or the network interaction format.

A further aspect provided is a method for evolving a defined online existing relationship pair between a first member and a second member, the online existing relationship pair defined by a first existing relationship role assigned to the first member having a plurality of first existing role features for use in managing network interaction on a communications network between the first member and the second member, and a second existing relationship role assigned to the second member having a plurality of second existing role features for use in managing the network interaction between the first member and the second member, the method comprising the steps of: receiving a new online relationship pair having a new first relationship role and a second new relationship role, such that the corresponding first new role features and the second new role features are different from the first existing role features and the second existing role features, the first new role features and second new role features being characteristic of the new relationship pair; aggregating the first existing role features and the first new role features as aggregate first role features being a combination of the first existing role features and the first new role features in order to define an aggregate first role; aggregating the second existing role features and the second new role features as aggregate second role features being a combination of the second existing role features and the second new role features in order to define an aggregate second role; storing the aggregate first role and the aggregate second role with their associated aggregate features in a storage as relationship data representing an aggregate relationship pair defined by the aggregate roles and their corresponding aggregate role features; and accessing the relationship data in order to determine whether a selected network interaction from one of the members is permitted in view of at least one of the corresponding aggregate role or aggregate role features of at least one of the aggregate first role or aggregate second role of the aggregate relationship pair, and facilitating the selected network interaction between the members when determined as permitted; wherein said at least one of the corresponding aggregate role or aggregate role features of at least one of the aggregate first role or aggregate second role of the aggregate relationship pair is used to define as permitted at least one of the network interaction type, the network interaction content, or the network interaction format.

A further aspect provided is a method for evolving a defined online existing relationship pair between a first member and a second member, the online existing relationship pair defined by a plurality of existing relationship features for use in managing network interaction on a communications network between the first member and the second member, the method comprising the steps of: receiving a new online relationship pair having corresponding new relationship features different from the existing relationship features, the new relationship features being characteristic of the new relationship pair; combining the existing relationship features and the new relationship features to generate combined relationship features by adding a new feature from the new relationship features to the existing relationship features, such that a minimum number of the existing relationship features remain as part of the combined relationship features; storing the combined relationship features in a storage as relationship data representing the new relationship pair for the members defined by the corresponding respective combined relationship features; and accessing the relationship data in order to determine whether a selected network interaction from one of the members is permitted in view of at least one of the corresponding combined relationship features, and facilitating the selected network interaction between the members when determined as permitted; wherein at least one of the corresponding combined relationship features of the new relationship pair is used to define as permitted at least one of the network interaction type, the network interaction content, or the network interaction format.

A further aspect provided is a method for evolving a defined online existing relationship pair between a first member and a second member, the online existing relationship pair defined by a first existing relationship role assigned to the first member having a plurality of first existing role features for use in managing network interaction on a communications network between the first member and the second member, and a second existing relationship role assigned to the second member having a plurality of second existing role features for use in managing the network interaction between the first member and the second member, the method comprising the steps of: receiving a new online relationship pair having corresponding first new role features and the second new role features different from the first existing role features and the second existing role features, the first new role features and second new role features being characteristic of the new relationship pair; combining the first existing role features and the first new role features to generate combined first role features by adding a new feature from the first new role features to the first existing role features, such that a minimum number of the existing first role features remain as part of the combined first role features; combining the second existing role features and the second new role features to generate combined second role features by adding a new feature from the second new role features to the second existing role features, such that a minimum number of the existing second role features remain as part of the combined second role features; storing the combined role features in a storage as relationship data representing the new relationship pair for the members defined by the corresponding respective combined role features; and accessing the relationship data in order to determine whether a selected network interaction from one of the members is permitted in view of at least one of the corresponding combined role features, and facilitating the selected network interaction between the members when determined as permitted; wherein at least one of the corresponding combined role features of the new relationship pair is used to define as permitted at least one of the network interaction type, the network interaction content, or the network interaction format.

A further aspect provided is a method for defining an online relationship pair between a first member and a second member, the relationship pair including a first relationship role assigned to the first member having a plurality of first role features for use in managing network interaction on a communications network between the first member and the second member, and a second relationship role assigned to the second member having a plurality of second role features for use in managing the network interaction between the first member and the second member, the method comprising the steps of: assigning the first relationship role to the first member such that the first role features are characteristic of the first relationship role; assigning the second relationship role to the second member such that the second role features are characteristic of the second relationship role, such that the second member must confirm the second relationship role in order for the first member to be able to use the first relationship role in the network interaction between the first and second members; storing the first role and the second role with their associated role features in a storage as relationship data representing the relationship pair; and accessing the relationship data in order to determine whether a selected network interaction from one of the members is permitted in view of at least one of the corresponding relationship roles or role features of at least one of the first role or second role of the relationship pair, and facilitating the selected network interaction between the members when determined as permitted; wherein said at least one of the corresponding relationship roles or role features of at least one of the first role or second role of the relationship pair is used to define as permitted at least one of the network interaction type, the network interaction content, or the network interaction format.

BRIEF DESCRIPTION OF THE DRAWINGS

Exemplary embodiments of the invention will now be described in conjunction with the following drawings, by way of example only, in which:

FIG. 12b is an example modification of the relationship of FIG. 12a;

DETAILED DESCRIPTION OF THE EMBODIMENT(S)

Relationship Environment Network 10

Figure 1:
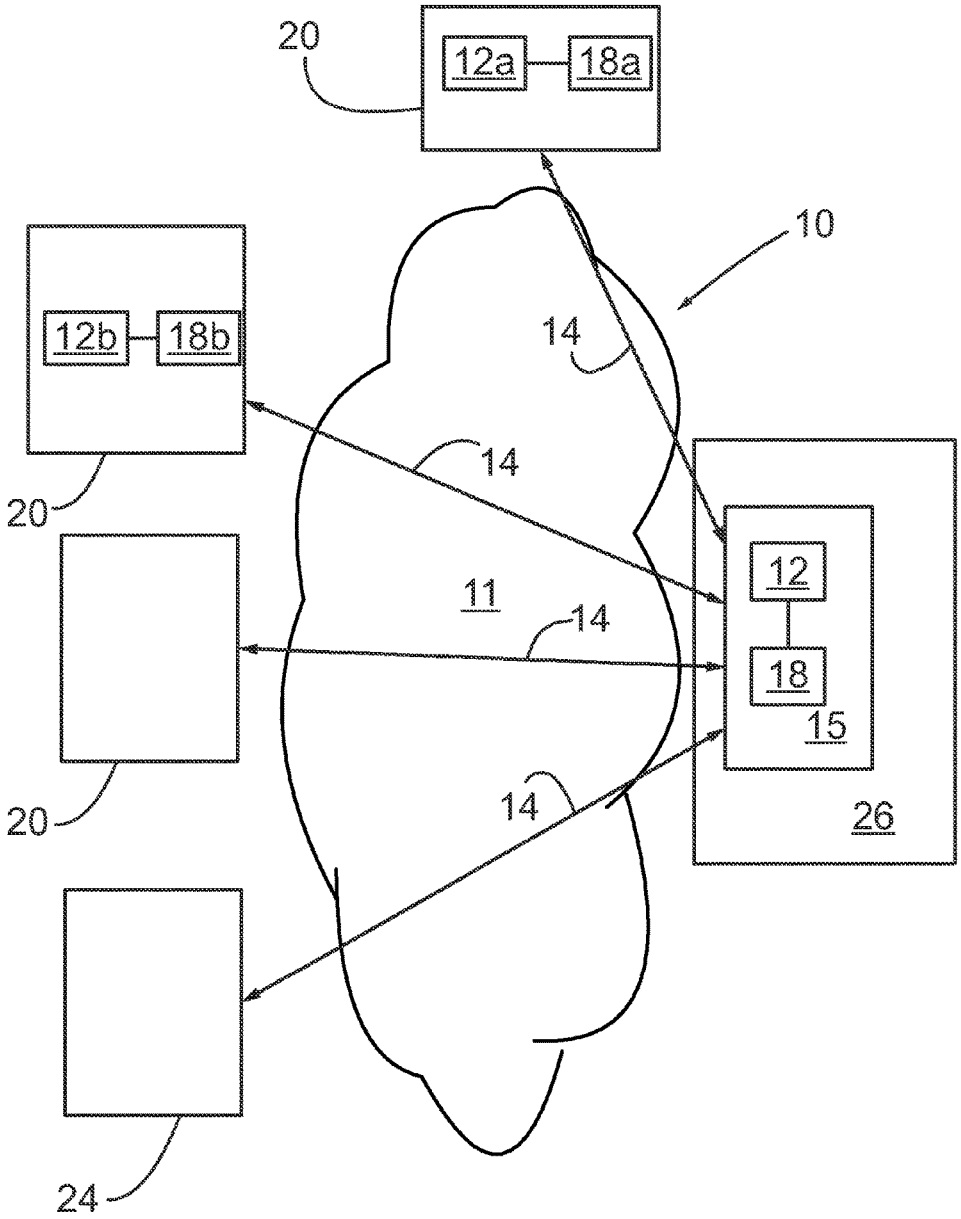
FIG. 1 is a block diagram of relationship network environment.

Referring to FIG. 1, relationship and security in online social and professional networks and communities is provided by a relationship environment network 10. The network 10 provides for members 20 (i.e. registered users) and non-members 24 (i.e. unregistered users) of a relationship administration system 26 to connect/communicate 14 over a communications network 11 with each other in ways that enhance their real world relationship, such that their online accounts (relationship data 15, otherwise known as a configured relationship matrix 15 for the plurality of members 20 and their optionally assigned relationship roles 12a,b) share information electronically and the members/non-members 20, 24 interact with each other electronically in accordance with a defined connection/shared relationship (e.g. relationship pair 12) defined and administered by the relationship administration system 26. It is recognised that both members 20 and non-members 24 will hereafter be referred to generically as members 20 for the sake of simplicity, such that members 20 can be of a type registered or unregistered (i.e. non-members). The administration system 26 provides for a plurality of defined relationship pairs 12 assigned to selected pairs of members 20 to adapt and change over time through amendment in the one or more relationship roles 12a,b (or to their commonly assigned relationship features 18 that are not assigned to any particular role 12a,b) assigned to the members 20 for representing any changes in the professional and/or personal relationship(s) between the members 20 with each other over time, as facilitated by relationship pair aggregation further described below.

It is also recognised that the term member 20 can be assigned to a single user and/or a group (e.g. two or more users) by the administration system 26, such that any individual of the group can use the group member 20 as a conduit to electronically interact with other group and/or individual members 20 via the network 11. For example, a group member 20 can be a number of individual doctors working together in the same clinic and an individual member 20 can be a sales representative connecting with and making appointments with the group member 20 as a customer of the sales representative (e.g. for selling medical supplies for the group individuals as a whole). It would be up to the individuals of the group member 20 to arrange amongst themselves who would be meeting the sales representative at the arranged time/place of the appointment, as the sales representative would not be concerned with whom of the individuals of the group member 20 attend the appointment—just that at least one of the group individuals would be available and make able to make/relay decisions concerning buying of medical supplies.

The administration system 26 could consider the group member 20 as a distinct member 20 of the relationship environment 10, realizing that any of the individuals of the group member 20 would have the same capabilities/features/privileges 18 and can use the group member 20 account 15 to interact 14 with other members 20. Alternatively, the administration system 26 could consider the group member 20 as a distinct member 20 of the relationship environment 10, realizing that certain individuals of the group member 20 would have slightly differing defined capabilities/features/ privileges/restrictions 18 (e.g. defined individuals when signed on as the group member 20 would only be able to view 14 appointments but not to confirm 14 them) when using the group member 20 account 15 to interact with other members 20 associated with the relationship administration system 26.

One example application of the network 10 and associated administration system 26 is for the healthcare industry, which can be characterized as having a particularly fragmented with a workforce—from physicians 20 to nurses 20 to practice administrators 20—that are extremely busy in their day to day activities. Day to day work in industry can also be highly irregular and unpredictable, and with so many different parts working in isolation there are limited opportunities for people to be exposed to one another. All of this makes it very difficult for industry professionals 20 to get in touch 14 with who they want when they need to, to stay in touch 14 with colleagues 20 and co-workers 20 within and/or between different industries, and to coordinate productive interactions 14 with each other. Accordingly, the ability to coordinate 14 meaningful and expected online relationships 12 between members 20, in particular the evolution of relationships between members 20 in a flexible and transparent manner is desirable, as further discussed below.

The relationship administration system 26 can be a web-based service/application, accessible by browser applications of the members 20, and can provide a medium for the community of members 20 for people (in healthcare and other industries) to electronically (i.e. online) find 14 and connect 14 with peers and/or non-peers, electronically communicate 14 and exchange ideas between members 20, and electronically coordinate interactions 14 (both online and in person, for example) between members 20; so that community members 20 can develop business networks (for example in conjunction with different types of friendships), build knowledge, and/or engage in purposeful productive relationships 12 outside of their immediate business environment. It is recognised that the electronic communications/connections 14 between the members 20 are conducted in the framework of the defined role pairs 12, for example, and the associated features/capabilities 18, as coordinated by the administration system 26 further discussed below.

Customer-Vendor Example

Figure 4:
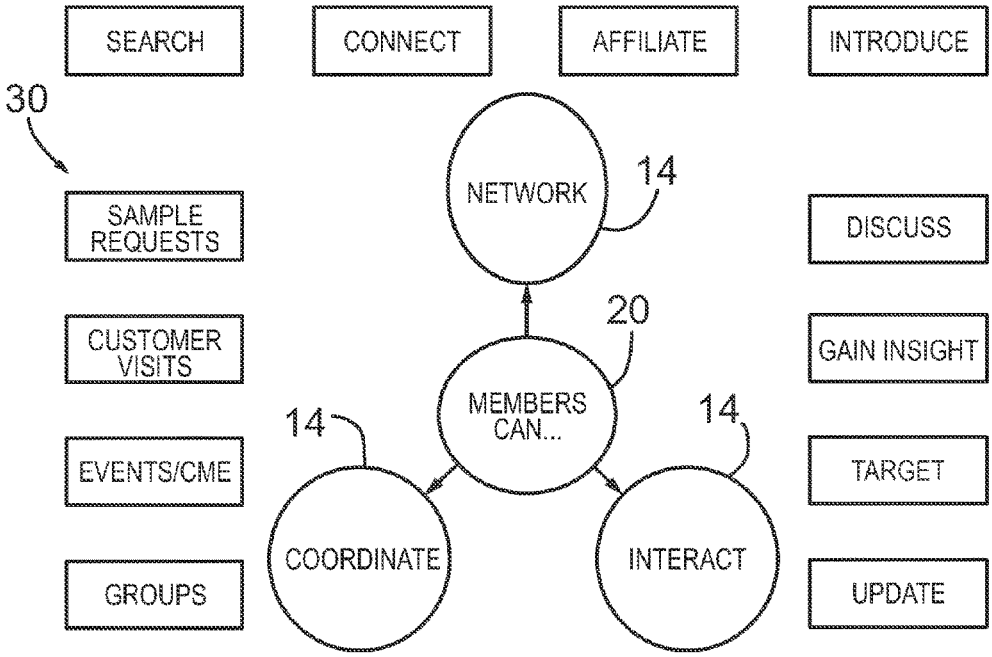
FIG. 4 shows an example claim of the environment of FIG. 1.

Referring to FIGS. 1 and 4, an example of the role pair 12 is Vendors (role 12a) who use the system 26 to have access to customer relationship management tools 30 that let them, as companies or as individual representatives with companies, reach out and connect 14 directly to target their Customers (role 12b) for their proffered goods and services. The management tools 30 provide the members 20 with different types of connection 14 options with one another over the network 11. The system 26 provides features that support the vendor 20 and the customer 20 in building new relationships 12, in enhancing/evolving existing relationships 12, and in enabling electronic communication, coordination, and value exchanges 14 between the assigned roles 12a,b of the role pair 12.

In economics, economic output can be divided into goods and services. When an economic activity yields a valuable or useful thing, it can be known as production output of the totality of products (e.g. goods or services) in an economy that the vendor 20 makes available 14 for use by the customers 20. Products as goods can range from a simple safety pin, food, clothing, computer components to complex aircraft. Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The vendor 20 providing the products can be a businessperson/individual engaged in wholesale/retail trade, an organization, an administration, and/or a business that sells, administers, maintains, charges for or otherwise makes available product(s) that are desirable by the customers 20. Accordingly, the vendor 20 can be one person, or an association of persons, for the purpose of carrying on some enterprise or business; a corporation; a firm; etc. Further, it is recognized that the offered 14 (electronically and/or in person) products/services can be applied to vendor 20 activities not related to specific product(s), for example activities such as customer service, community activities, and/or sponsorships. These general activities of the vendor 20 are also considered as part of the definition of vendor 20 products.

It will be understood that for the purposes hereof, the customer 20 may be any user (i.e. first hand product experience) of vendor 20 products (e.g. goods and/or services). For example, the customer 20 may be an individual who purchases vendor 20 goods and/or services for personal use, and not for resale or for use in the production of other goods and/or services for resale. Or the customer 20 may be a business purchasing vendor 20 goods and/or services for use in its business, i.e., for resale or for use in the production of other goods and/or services for resale. Further, it is recognized that customer 20 may not purchase the goods and/or services. For example, the customer 20 may have acquire the goods and/or services pursuant to a free trial offered by the vendor 20.

Any business or organization can be called an enterprise, while consumers are individuals or households that purchase and use goods and services generated within the economy. It is recognized that both enterprises and consumers can be included in the definition of customers 20. For example, the definition of B2C (Business-to-Consumer) is used to define the interaction between a business/vendor 20 (e.g. enterprise) that sells products or provides services to end-user consumers (e.g. customers 20). Further, for example, Business-to-Business (B2B) can be used to represent for relations between enterprises (e.g. between a business vendor 20 and a business customer 20), contrary to relations between enterprises and other groups (e.g. customers, public administration). The term B2B can be used to define marketing activities as well as electronic communication relations between enterprises. For example, B2B-Marketing can be used to describe all products and services used by enterprises. B2B marketing can be considered more complex than B2C marketing because on the buyer's side, there can be more than one person involved in a B2B sale/purchase, the buying center.

Accordingly, it is recognized that the customer 20 can be a private individual desiring information/purchase (e.g. B2C) of the vendor 20 products or can be a person, or an association of persons, for the purpose of carrying on some enterprise or business (e.g. a corporation, a firm, etc.) that desires information/purchase (e.g. B2B) of the vendor 20 products. It is recognized that the customer 20 can communicate 14 with the vendor 20 as a potential purchaser (i.e. window shopping) or as an intended purchaser of the vendor's 20 products, as desired.

Relationship Matrix 15

When two or more members 20 are engaged in one or more relationship pairs 12 (active and/or passive), these members 20 interact 14 with each other on the administration system 26 (via the network 11) in accordance with their relationship pair(s) 12 and their respective optional roles 12a,b the members 20 have in those relationship pair(s) 12. It is recognised that between any pair of members 20, a plurality of distinct types of relationship pairings 12 can be assigned to them, which facilitates the evolution of their overall online relationship with one another. For example, any two members 20 can first start off with being the role of associates 12a,b in an associate based relationship pair 12 (having associate features/capabilities 18a,b for coordination of the various connections/actions 14 enabled by the associate based relationship pair 12. At a later date, the two members 20 then add (e.g. aggregate) being the role of customer-vendor 12a,b in a customer-vendor based relationship pair 12 having customer or vendor based features/capabilities 18a,b for coordination of the various connections/actions 14 enabled by the customer-vendor based relationship pair 12. In other words, the members 20 now have a general relationship with one another that is a combination of associate/customer 12a or associate/vendor 12b with one another and therefore all of the features/capabilities 18a,b assigned to each member 20 is a combination of associate/customer 18a or associate/vendor 18b, as further described below with respect to relationship banding and relationship aggregating. The relationship matrix 15 is used as a memory construct/database (e.g. table, chart, etc.) for defining/storing all of the features/capabilities 18a,b, roles 12a,b, and/or all the possible interactions 14 between members 20 over the network 11.

It is also recognised that as an alternative embodiment the defined online existing relationship 12 between a first member 20 and a second member 20 can be defined by a plurality of existing relationship features 18 for use in managing network interaction 14 on the communications network 11 between the first member 20 and the second member 20. The relationship features 18 are characteristic of the relationship 12, such that at least one of the corresponding relationship features 18 of the relationship 12 is used to define as permitted at least one of the network interaction 14 type, the network interaction content, or the network interaction format. It is recognised that the relationship features 18 can be between the first member 20 and the second member 20 (i.e. each of the members 20 do not have a defined relationship role 12a,b, in the relationship 12). Or, as further discussed above, it is recognised that a first portion of the relationship features 18a characterizes the first relationship role 12a and a second portion of the relationship features 18b characterizes the second relationship role 12b of the relationship pair 12, such that the first relationship role 12a and the second relationship role 12b are part of the relationship defined as the relationship pair 12 between the first and second members 20. In other words, the aggregate relationship pair 12, described above by example only, can be administered by the administration system 26 as a role-less relationship 12, such that the relationship features 18 are shared between the members 20 for managing their inter-member 20 interactions 14, or can be administered as a roled 12a,b relationship pair 12, such that each of the roles 12a,b have characteristic role features 18a,b.

Figure 8:
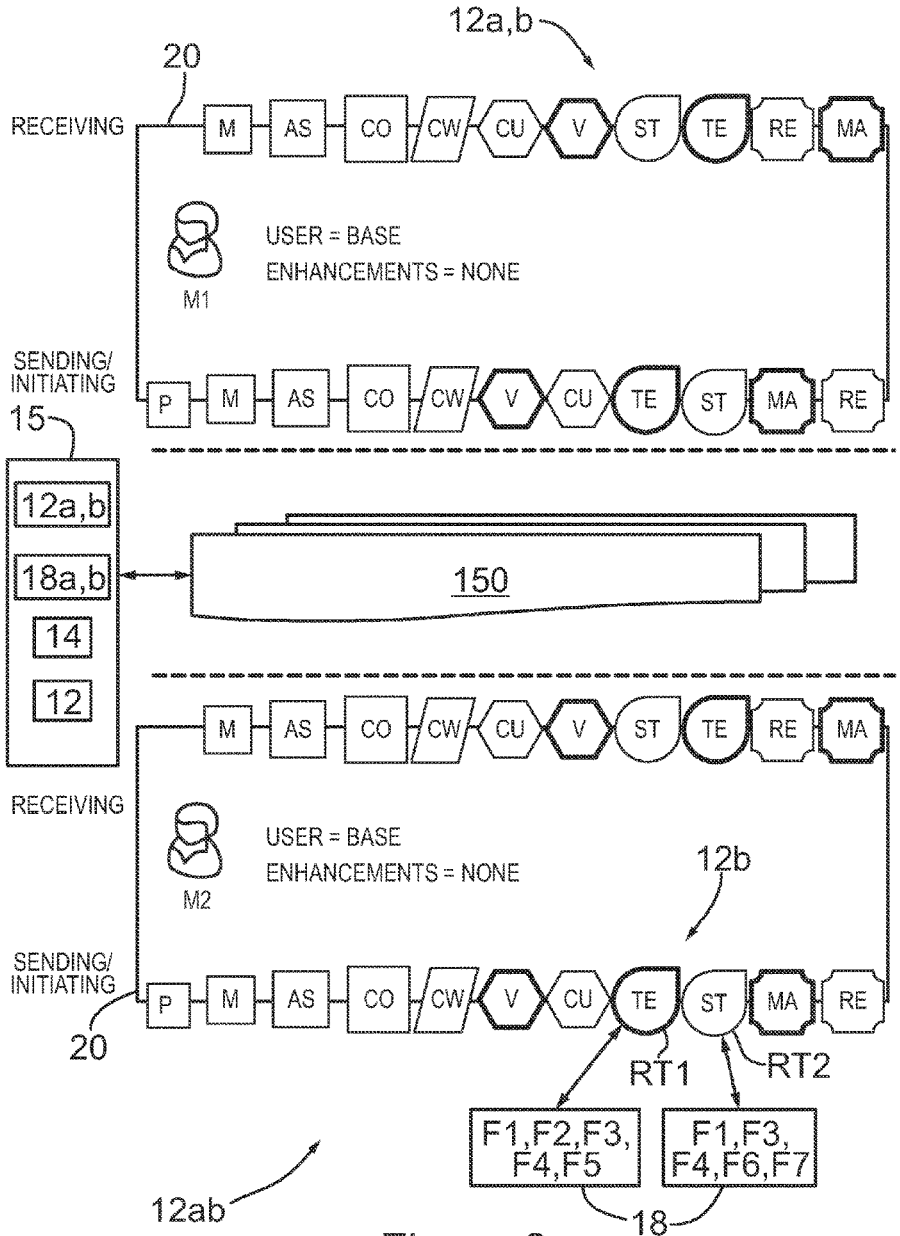
FIG. 8 shows a relationship matrix used by the relationship gate of FIG. 3.

Referring to FIG. 8, any possible interaction 14 that can occur between two members 20 can be defined and therefore enabled/disabled in the relationship matrix 15 via the respective features 18 and the actual implementation of the interaction 14 is assessed (through reference to the matrix 15) and either accepted or declined by the Relationship Gate 150. The relationship matrix 15 is therefore available (locally or remotely over the network 11) to the Relationship Gate 150, to maintain an understanding of the roles 12a,b inside of the assigned relationship pairs 12 in affect (e.g. active and/or passive) at any point in time between members 20

The feature or capabilities 18a,b available between members 20 can include such as but not limited to: information visibility/sharing 14 (via profiles, searches, contact records, etc.); notifications and updates 14; communications 14; Events Coordination 14; Interactions 14 Online and Coordination 14 of Interactions Offline; Preferences for the features/capabilities 18a,b (i.e. limited member 20 specific customization of the general features/capabilities 18a,b available under the role(s) 12a,b); and Relationship views 14.

Further, it is recognised that the matrix 15 is used by the relationship gate 150 to determine whether or not an action 14 initiated by the member 20 with respect to another member 20 (e.g. send a meeting request for sales call) will be completed as an allowable Relationship Interaction 14 (as defined by the features/capabilities 18, 1803, shared or distributed in defined roles 12a,b), or whether the action 14 is halted because it cannot occur (i.e. the desired action 14 is not compatible with one or both of the feature/capability sets 18, 18a,b of the member(s) 20.

Further, it is recognised that the administration system 26 can provide feedback communication to the requesting member 20 if the action 14 resulted in no Interaction (e.g. not allowed). Also, it is recognised that the administration system 26 can provide feedback communication to the requesting member 20 if the action 14 resulted in Interaction (e.g. allowed). Also, it is recognised that the administration system 26 can provide feedback communication/notification to the intended recipient member 20 of the action 14 if it resulted in no Interaction (e.g. not allowed). Also, it is recognised that the administration system 26 can provide feedback communication/notification to the intended recipient member 20 of the action 14 if it resulted in Interaction (e.g. allowed).

Referring again to FIG. 8, the capabilities/features/privileges/restrictions 18a,b (hereafter referable as features 18 for the sake of simplicity) are grouped as associated/assigned to the respective individual relationship role 120, for example. For example, a first role type RT1 would have a set/group of assigned features F1,F2,F3,F4,F5,etc. and a second role type RT2 would have a set/group of assigned features F1,F3,F4, F6,F7,etc. It is recognised that the sets/groups of assigned features 18 can have some individual features 18 in common (e.g. overlapping sets/groups of features 18), however each set/group of features 18 as a whole is unique in feature 18 content to the respective role type 12a that they are assigned. In this manner, the administration system 26 can facilitate that a first role type RT1 has a unique first set of assigned features 18 and therefore cannot be confused with a second role type RT2 having a unique second set of assigned features 18, such that the first and second set of features 18 are not identical. For example, the role type 12a of a Colleague would have different set of features 18 than that of a Vendor, otherwise a Colleague could be confused for a Vendor during interactions 14 over the network 11 as defined by the particular role features 18 set that is unique to the particular role type 12a.

It is also recognised that some features 18 can be superseded by other features 18, either in whole or in part (e.g. to take the place of such as replace or to augment so as to make an already assigned feature 18 greater/lesser in size, extent, or influence), during aggregation of relationship pairs 12 and their corresponding roles 12a,b and features 18a,b, as further described below with respect to aggregate relationship pairs 6 (see FIG. 9).

Interactions/Connections/Communications 14

Referring again to FIG. 1, members 20 via the administration system 26 can connect 14 with each other in ways that represent their real world trusted relationships, including nonmember 20 interactions. It is recognized that the following discussed member 20 interactions 14 (as facilitated/defined through the features/capabilities 18a,b that are shared between members of the relationship pair 12 and/or are associated with the role types 12a,b of the relationship pair 12) is for exemplary purposes only, recognizing that nonmembers 20 can and will have at least some of the features/capabilities 18a,b that are appropriate to their base relationship profile 12a (e.g. public) recognized by the system 26.

Figure 6:
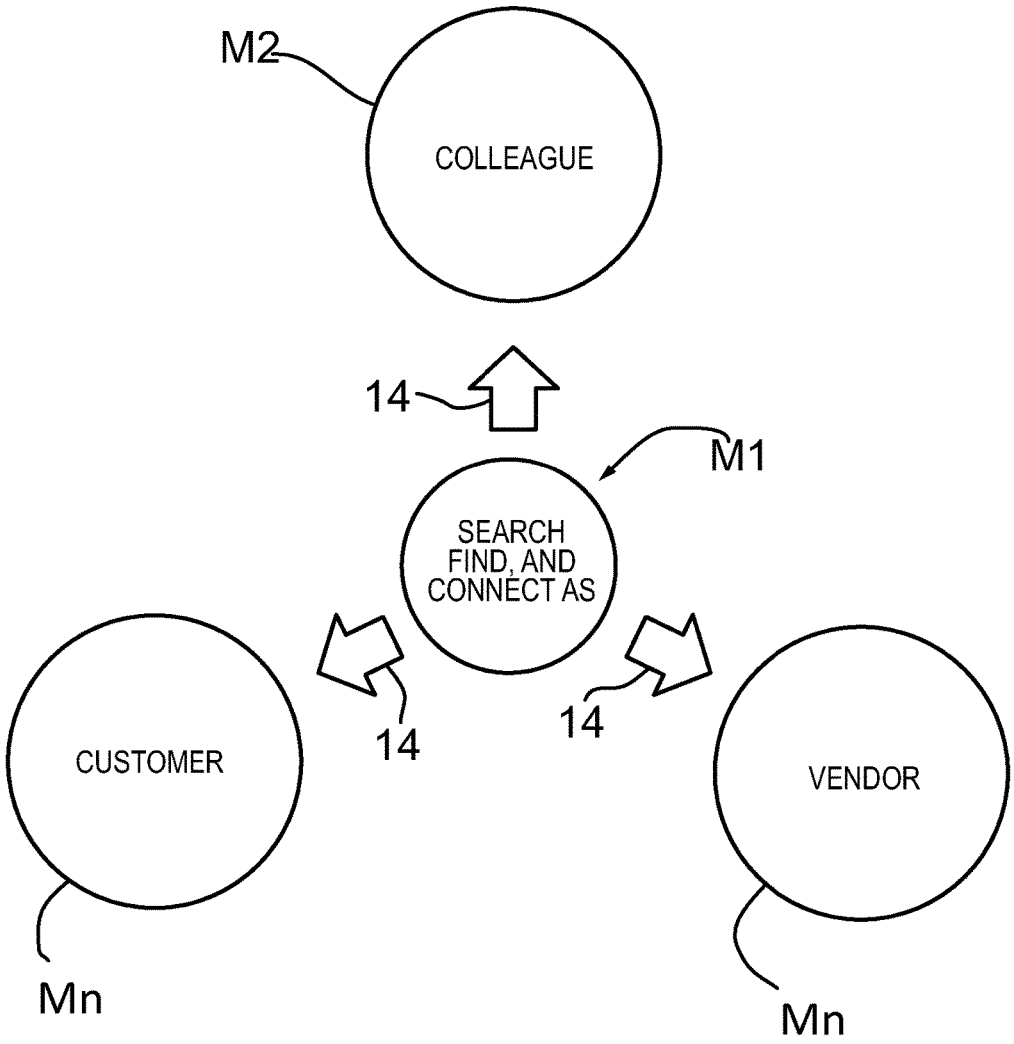
FIG. 6 shows example member roles of the members of FIG. 1.

Referring to FIGS. 1 and 6, the types of relationships (i.e. role 12a,b of the defined role pair 12) that member 1 (M1) is in with other members (Mn), and the administration system 26 connection relationships that a M1 has with a specific member (M2), will impact: the information M1 can enter 14 into the relationship data 15 about themselves; the information M1 is able to share 14 about themselves, and who they're able to share it with; the features/capabilities 18 a member 20 is able to use in their defined role(s) 12a,b; the features/capabilities 18 M1 is able to use when interacting with Mn; the ability for M1 to join a Group; the types of requests/responses 14 that the member M1 can have over the network 11; and/or the results 14 of any searches member M1 executes 14. Further, the relationships that a person may be dependent on factors such as: the role pair 12 assigned to the member 20; service package(s) purchased or otherwise acquired 18 by the member 20 as facilitated by the system 26; and organization type and relationship of the organization with the system 26. For example, in FIG. 6 member M1 (via their defined two role pairs 12 of customer-vendor and colleague-colleague) can communicate 14 (as enabled/defined through their various features/capabilities 18 as share and/or as assigned 180 to respective roles 12a,b) with member M2 being both a fellow colleague 12a and a respective customer 12a of member M1 (being a colleague 12a and vendor 12b). For example, member M1 and member M2 can interact 14 with each other as colleagues 12a by sharing 14 their in-office calendars (e.g. showing both personal and business activities) as well as placing 14 and accepting 14 orders respectively for particular beauty products (i.e. member M1 is a part-time vendor of skin creams and candles).

Member M1 can also communicate 14 with other vendors 12b (defined by the system 26) of the members Mn (for example other part-time vendors of skin creams) to find out whether their customers may be interested in their products (i.e. candles) and to make an introduction/referral 14 to the member Mn customers 12a. This is an example where member M1 has an active relationship role 12 of customer-vendor and colleague-colleague with member M2 and member M2 has passive relationship roles 12a,b of vendor-vendor with other members Mn. It is recognised that the system 26 s (and enforce via the relationship gate 150 see FIG. 7) the various capabilities/features 18b of the vendors 12b differently for the above-described role pair customer-vendor 12 and vendor-vendor 12. For example, member M2 could offer 14 their products for sale to member M1 with the ability to provide 14 order forms and invoicing. However, member M2 could not do these same interactions 14 with member Mn, rather member M2 could only perform with member Mn initial contact 14 and request 14 introductions to the customers 12a of the member Mn. On the other hand, members M2 and Mn could decide to enter into customer-vendor relationships 12 and then member M2 would gain the additional vendor features/capabilities 18b commensurate with members Mn being their customer 12a.

It is recognised that the content (e.g. text, image, video, enclosures, message type (email, telephone, text message, etc.), message enclosures, content size/amount/length) and/or format (e.g. form of the content such as colour, font style, message priority, etc.) of the interactions 14 can be defined and their generation by the member 20 coordinated by the associated features/capabilities 18 (e.g. of the role 12a,b) that the member 20 is using/operating under on the administration system 26 with selected (active and/or passive) other members 20. It is also recognised that the content and/or form of the interactions 14 can be defined using a combination of different roles 120 and/or their associated features 18a,b in view of aggregation of relationship pairs 12, further described below.

In general, when a member (M1) initially connects 14 with another member (M2) via the system 26, M1 can choose the type or types of relationships (e.g. the role pair(s) 12) they are connecting to M2 in. These relationship role types can include defined role pairs 12 such as but not limited to:

| Relationship | Trust level | Communications 14 | Information Sharing 14 | Interactions 14 | Business Exchange Info 14 | Relationship Management Capabilities 14 |
|---|---|---|---|---|---|---|
| Blocked | None | None | None | None | None | None |
| Public (default) | Minimum | Minimum | Minimum | None | None | None |
| Associate to Associate | Low | Low | Minimum | None | None | None |
| Colleague to Colleague | High | High | High | High | Low | Low |
| Customer to Vendor/Vendor to Customer | Medium | Medium | Medium | High | High | High |
| Student to Teacher/Teacher to Student | Medium | Medium | Medium | High | None | Low |
| Co-Worker to Co-Worker | Medium | Medium | Medium | Medium | Medium | Med |

A number of interactions 14 are impacted by relationships features/capabilities 18 of the defined role pair(s) 12 between the members 20, including for example with respect to booking of appointments/meetings and the contents/substance of the meetings:

- Ability to input 14 available Time for appointments/meetings as visible on their online profile 9;
- Available Time Viewing 14 and Booking 14 for appointments/meetings as visible on their online profile 9;
- Sample requests 14 as visible on their online profile 9;
- Product input and display 14 as visible on their online profile 9 or otherwise sent in communications 14 to their member of the role pair 12;
- Territory Management 14;
- Call Management 14;
- Call Mapping 14;
- Auto Call Booking 14; and/or
- Auto Rebooking 14 of Calls.

Example Interaction 14—Available Appointment Time

Referring to FIG. 1, the AVAILABLE TIME PROCESS allows members 20 who are connected with each in a VENDOR (i.e. role 12b) and CUSTOMER (i.e. role 12a) relationship (i.e. role pair 12) to coordinate their interactions 14 so as to facilitate sales calls and meetings that are more predictable and productive than the current prior art systems. The process enables CUSTOMERS to identify 14 when they have AVAILABLE TIME (either MEETINGS or FLEX CALLS) for VENDORS to visit.

For MEETINGS, the CUSTOMER simply sets up 14 when he wants a VENDOR to come (e.g. 10 to 10:15 am on Wednesday or 12:30 to 1:30 pm for lunch on Thursday.) FLEX CALLS are periods of time that the CUSTOMER has indicated they will accept a number of drop-in calls (e.g. between 1 pm and 3 pm on Fridays they would accept up to three FLEX CALLS.), as visible on their online profile 9.

Only members 20 who are connected to a CUSTOMER as a VENDOR can see 14 AVAILABLE MEETINGS and/or AVAILABLE FLEX CALLS as visible on their online profile 9. VENDORS who want to BOOK 14 any OPEN MEETINGS or FLEX CALLS will do so on a first come first serve basis, and in accordance with any preferences designated by the CUSTOMER as visible on their online profile 9.

Only one VENDOR may be able to BOOK 14 a single MEETING. Once booked, the AVAILABLE MEETING is BOOKED and may be not visible to other VENDORS for booking. (Note that a VENDOR or CUSTOMER can CANCEL the meeting, which could reopen the AVAILABLE MEETING to be booked by a different VENDOR.

Multiple VENDORS can book 14 calls during an AVAILABLE FLEX CALL period as visible on the CUSTOMER'S online profile 9. The number is limited by the maximum specified by the CUSTOMER. A FLEX CALL that has been BOOKED by a VENDOR is a period when they will be expected to drop in to see the CUSTOMER. The system 26 can divide the FLEX CALL period into a number of set length (and overlapping, if needed) windows. VENDORS who book a FLEX CALL book a specific window, and this distributes the bookings and reduced situations where multiple VENDORS call on a CUSTOMER at the same time.

The specific time within the AVAILABLE FLEX CALL TIME when the call is to be made is up to the VENDOR. This enables them to choose 14 a time that works best with their schedule, but also provides flexibility to the CUSTOMER who has no obligation to maintain an exact meeting time, as input and then made visible on their online profile 9. Also, the actual discussion produced with a FLEX CALL has no set length, and will be something that works for the VENDOR and the CUSTOMER.

Only system 26 USER TYPES that are in the CUSTOMER class of user types can create 14 AVAILABLE TIME. Further, only system 26 Users who are a VENDOR CONTACT (i.e. part of the role pair(s) 12 defined between the VENDOR and CUSTOMERS) of these CUSTOMERs can view 14 the AVAILABLE TIME as visible on the CUSTOMER online profile 9 to book it.

A VENDOR can view 14 a CUSTOMER's calendar on their online profile 9 to find and BOOK any OPEN (not booked) AVAILABLE FLEX CALL WINDOWS. Each FLEX CALL WINDOW will have a start time and an end time (usually 60 minutes apart.)

Only the VENDOR or a CUSTOMER can see and book 14 the AVAILABLE FLEX CALLS on the online profile 9 for the CUSTOMER, as defined and enabled via their defined role pair 12. To other member types (such as colleagues, co-workers, etc) the time where an AVAILABLE FLEX CALL can appear 14 on the member's online profile 9 to be BUSY time, whether the call is BOOKED or OPEN. (This is because the CUSTOMER is saying this time is booked for my VENDORS, and is therefore expected to be booked.). Accordingly, it is recognized that the online visible profile 9 of any particular member 20 to any other member 20 is influenced by the role pair(s) 12 defined between the respective members 20.

Once a FLEX CALL WINDOW maximum booking number (BWmax) is reached, that window is considered FULL and is not viewable by VENDORS other than those that have booked it. For both AVAILABLE MEETINGS and for AVAILABLE FLEX CALLS, the system 26 can permit the CUSTOMER to set PREFERENCES 18 for the calls. These PREFERENCES 18 can take the form of:

- Capability to set PREFERRED VENDORS, PREFERRED VENDOR ORGANIZATIONS, PREFERRED PRODUCT INTERESTS, etc;
- Frequency that any one VENDOR can BOOK an AVAILABLE MEETING;
- Frequency that any one PREFERRED VENDOR can BOOK an AVAILABLE MEETING;
- Frequency that any one VENDOR can BOOK an FLEX CALL;
- Frequency that any one PREFERRED VENDOR can BOOK an FLEX CALL;
- Frequency that any one VENDOR ORGANIZATION can BOOK an AVAILABLE MEETING;
- Frequency that any one PREFERRED VENDOR ORGANIZATION can BOOK an AVAILABLE MEETING;
- Frequency that any one VENDOR ORGANIZATION can BOOK an FLEX CALL;
- Frequency that any one PREFERRED VENDOR ORGANIZATION can BOOK an FLEX CALL;
- Frequency that any one VENDOR that is discussing a specific PRODUCT can call; and/or
- Some AVAILABLE TIMES can be designated for specific PRODUCTS. (This can be put in the notes, but the TRApp can also support this by confirming the product type of the VENDOR.

The system 26 can also facilitate the capability to support multi CUSTOMER calls, and allowing multiple VENDORS to book 14 the same FLEX CALL PERIOD. This would be an event situation. CUSTOMERS can also customize the FLEX CALLS to have FLEX CALL WINDOWS of any length. (e.g. 60 minutes in length, except when the entire AVAILABLE FLEX CALL DURATION is 30 minutes when the window can also be only 30 minutes.

Relationships Defined Using Relationship Pairs 12

Figure 3:
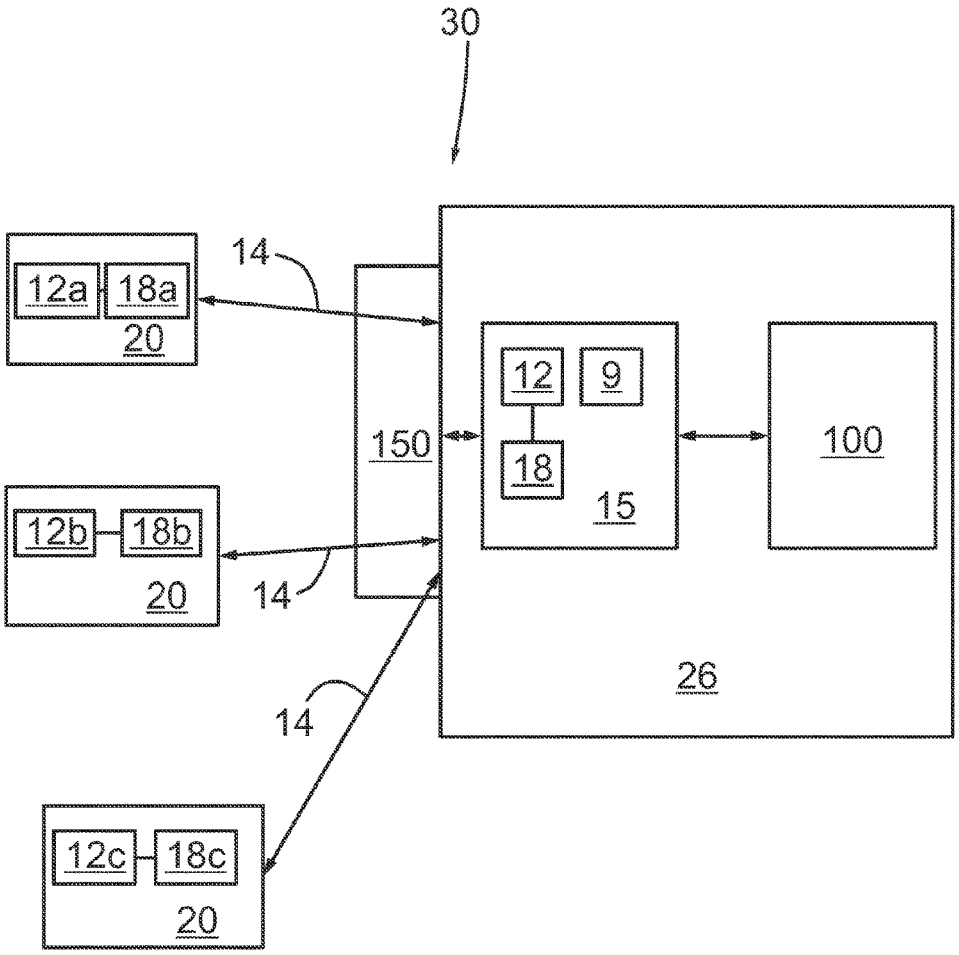
FIG. 3 shows example interactions between members in the relationship management system of the system of FIG. 1.

Referring to FIGS. 1 and 3, control and transparency of all connection relationships 12 in the networked environment 10 promotes member 20 confidence in interactions 14. Members 20 know who they're connecting 14 to, how they're connecting 14 to them, how they're being seen 14 by other members 20 they're connected to, and exactly what it means to be connected 14 to another member 20 in a specific relationship pair 12.

Further, members 20 have control of their relationships 12, just like they have in real life. It's not a one size fits all world and, in business, people have different relationships 12, the administration system 26 provides for this, for example through paired relationship roles 12a,b, letting members 20 decide what relationship role 12a,b of a paired relationship 12 they want to have with another member 20. The paired relationship roles 12a,b (and optional directional relationships 12, further described below) can provide that, when a member 20 engages 14 in an online relationship 12 with another member 20, they know the role 12a,b they play in the relationship and the corresponding role 12b,a the connected (of the relationship pair 12) member 20 plays. If a pair of members 20 who are in only one customer-vendor relationship 12, then one of the members 20 must be the vendor role 12b and one must be the customer role 12a. Example, in a colleague-colleague relationship pair 12 or in a customer-vendor relationship pair 12, it's clear to both sides exactly what role 12a,b each member 20 is playing. For example, I can't be someone's vendor 20, and not have them be my customer 20.

The relationship environment network 10 provides a social network to the members 20, by enabling members 20 to connect to each other in ways that represent their real world business relationships using defined relationship pair(s) 12, including within the pairs 12 example roles 12a,b such as but not limited to: as an associate; as a colleague; as a co-worker; as a customer; as a vendor; etc. Selected roles 12a,b are compatible with other selected roles 120 and other selected roles 12a,b are not compatible with certain roles 12a,b, as further described below (for example, a role 12a of vendor may not be compatible with the features/capabilities 18 of a role type 12b of colleague, while a role 12a of vendor would be compatible with the features/capabilities 18 of a role type 12b of customer). It is recognised that each of the associated roles 12a,b of the role pair 12 includes a plurality features/capabilities 18 that are defined by the administration system 26, as further discussed below. Once connected via the system 26, members 20 users of the administration system 26 communicate, share information, and/or coordinate interactions via communications 14 with each other in accordance with their professional and/or person relationship defined by their role(s) 12a,b with each other in the role pair(s)/pairing(s) 12. It is recognized that the communications 14 can consist of messages (e.g. SMS messages, texting, emails, phone calls, etc.) sent to one another, as well as viewing the online profiles 9 (e.g. system 26 Web page showing the profile of the member 20 with user name, interests, other member 20 connections, hobbies, etc.) of the members 20.

Some relationships require both members 20 to be in the same role 12a, such as in a Colleague to Colleague relationship 12. Other relationships, such as Customer to Vendor relationships 12, require each user to have a different role 12a,b.

Figure 5A:
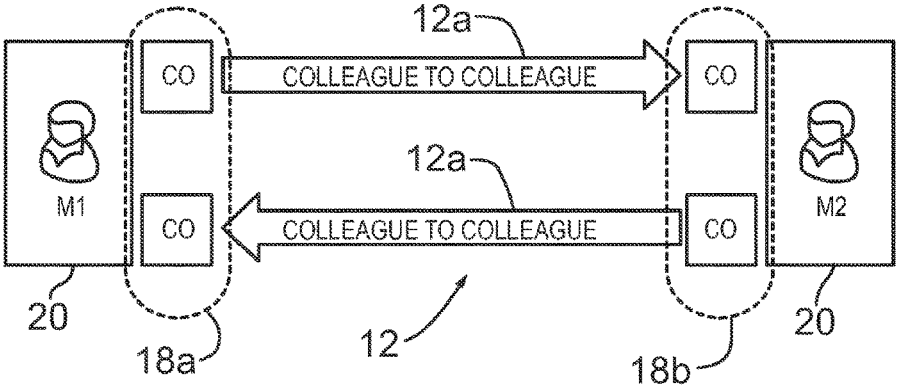
FIGS. 5a,5b,5c show example relationship pairs of the members of FIG. 1.
Figure 5B:
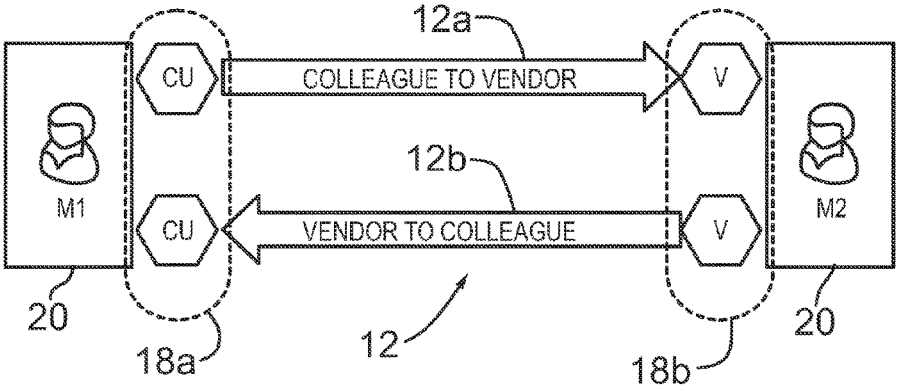
Figure 5C:
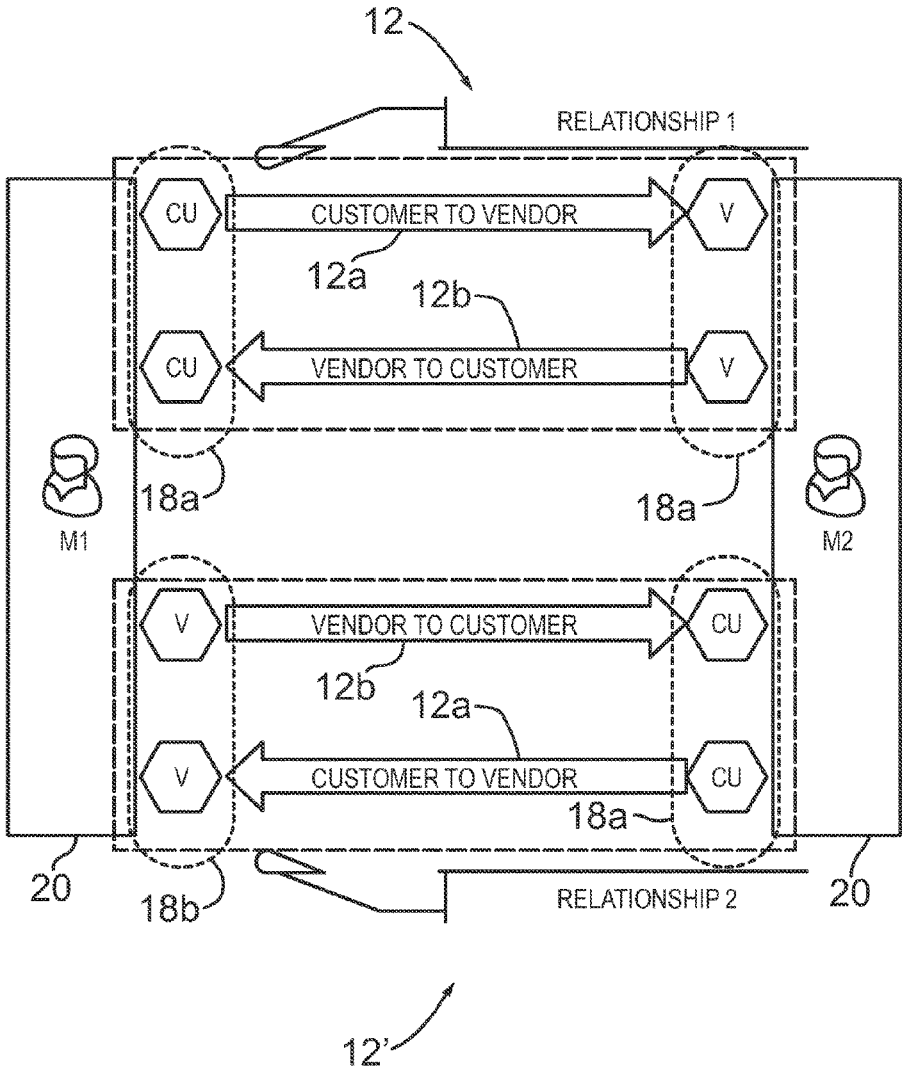

Referring to FIGS. 5a,b,c, in any relationship pairing 12, there can be two relationship roles 12a,b that may be of the same or different role types. In FIG. 5a M1 is the colleague 12a and M2 is also the colleague 12a, such that both members 20 M1 to M2 want to be Colleagues so both users must play the role of a Colleague 12a in this Colleague to Colleague relationship 12. In FIG. 5b M1 is the customer 12a and M2 is the vendor 12b, such that the two members 20 M1 and M2 want to be in a Customer to Vendor relationship 12 where M1 plays the Customer role 12a and M2 plays the Vendor role 12b. In FIG. 5c M2 is the customer 12a and M2 is the vendor 12b for one relationship pair 12 and M1 is the vendor 12b and M2 is the customer 12a for another relationship pair 12' that they have, such that the same M1 and M2 members 20 can also have a second Customer to Vendor relationship 12' where M2 plays the Customer role 12a and M1 plays the Vendor role 12b.

A relationship role 12a,b is the specific capacity a member 20 takes when acting in a system 26 supported relationship 12 with another member 20 who has a specific counter/associated role 12a,b to that relationship pairing 12. It is recognised that the capabilities and features 18 between two paired roles 12a,b may not be the same. For example, in a Customer to Vendor relationship 12, one user must always be the role 12a of Customer 20 while the other user must always be the role 12b of Vendor 20, since the customer 20 is the one who asks questions about and purchases items from the vendor 20, while the vendor 20 is the one that provides answers about products and facilitates sale of their products. The administration system 26 would define (via the matrix 15) and can assign of the allowable features 18a,b specific to the assigned role 12a,b of the role pair 12. In other words, for example, the customer 20 would not have (i.e. the matrix 15 would not enable these features 18b for the customer role 12a) the vendor 12b type features 18b of offering 14 products for sale and invoicing 14 for same over the network 11 with the vendor 20 (since that is what a vendor 20 does), while at the same time the vendor 20 would not have (i.e. the matrix 15 would not enable these features 18a for the vendor roles 12b) the customer 12a type features 18a of requesting 14 product information and paying 14 invoices for purchased products over the network 11 with the customer 20 (since that is what a customer 20 does). Accordingly, in this case, it is clear that a particular member 20 can only be the customer role 12a with corresponding features 18a when paired to the particular member 20 who is the corresponding vendor 12b role with corresponding features 18b, for the relationship pairing 12 of customer-vendor for the paired members 20. It is also recognised that the features 18 of a selected relationship pair 12 can be shared between the members 20 of that relationship pair 12 in a role-less relationship pair 12.

For example, referring to FIG. 3, the system 26 provides a plurality of predefined role pairs 12 for selection by each of the members 20 (e.g. a plurality of different defined role pairs 12 having respective role 12a associated with role 12b, such that each of the defined role pairs 12 have assigned respective different feature/capability sets 18) that can be assigned to any particular pair of the members 20. Therefore, each of the defined role pairs 12 has list of available features/capabilities 18 that are associated with the particular role pair 12, for example role 12a of role pair 12 has a list of features/capabilities 18a that is compatible with the list of features/capabilities 18b of the role 12b of the role pair 12. It is recognized that the features/capabilities 18a may or may not be exactly the same as the features/capabilities 18b, i.e. may be different for each member 20 of the pair 12 such as for vendor-customers, student-teacher, etc. This is different from the case where the roles 12a are the same/equal such as for colleague to colleague, friend to friend, member to member. In the case where the features/capabilities 18a are the same, this could be where the relationship role pair 12 has two equal roles 12a (e.g. public to public, friend to friend, colleague to colleague). In the case where the features/capabilities 18a,b are not the same, this could be where the relationship role pair 12 has two associated dissimilar roles 12a,b (e.g. vendor to customer, student to teacher), however, it is recognized that the dissimilar features/capabilities 18a,b would be compatible with one another as defined by the role pair 12. It is also recognised that the features/capabilities 18a,b assigned to the roles 12a,b can be directional, such that there may be more assigned features/capabilities 18a for the role 12 a as compared to the that the features/capabilities 18b assigned to the role 12b of the role pair 12, as further described below.

The features/capabilities 18 assigned to the roles 12 are reflected in type of connections 14 that can be initiated (and responded to) by the members 20 in their relationship role(s) 12, An example of this is where the first member 20 having the role 12a could be a vendor and be able to send vendor communications 14 listing products/services for sale, while the second member 20 having the paired role 12b of a customer would be able to receive 14, view 14, and respond 14 to the original vendor communications 14 (e.g. order to buy offered products/services), i.e. the members are in a Vendor-Customer role pair 12 relationship, as defined in the system 26. It is recognized that the customer would not be able to send vendor communications 14 to the vendor and the vendor would not be able to place orders 14 to the customer, in this case, unless the members 20 had their relationship role data 15 defining both a Vendor-Customer role pair 12 and a Customer-Vendor role pair 12 between them, such that each member is both a customer and a vendor with respect to the other member 20 of their defined role pair(s) 12.

It is also recognized that for an active relationship 12 in the administration system 26, both sides of the relationship pair 12 can be cognizant of the assigned roles 12a,b of their other member 20 of their member pair 12, i.e. a vendor knows who their customer is and the customer knows who their vendor is and each is knowledgeable of the features/capabilities 18 of the others role 12. In other words, a first member 20 cannot hide the fact from a second member 20 that the members 20 have defined and dissimilar roles 12a,b that are compatible with one another (e.g. a customer of a vendor knows that they are identified in the system 26 as the customer of the respective vendor and the vendor of the customer knows that they are identified in the system 26 as the vendor of the respective customer. It is also recognized that each of the members 20 can have a plurality of different roles 12a,b (of respective role pairs 12) with the same and/or different member(s) 20, such that each of the role pairs 12 (active and/or passive) have an inbound and an outbound role connection (i.e. directional roles 12a,b) to the other member 20 associated in the role pair 12.

For example, a first member 20 signs onto the system 26 and provides a user role/profile 12a (e.g. their profession, their specialty, their country, hobbies, and any other personal defining information). The first member 20 may also set up with the system 26 certain defined roles 12a,b that may or may not have accepted member pair relationships 12 (e.g. the first member 20 can have a vendor role 12b with a confirmed/accepted customer role 12a with a second member 20 that defines an active pair relationship 12, and/or the first member 20 can register with the system 26 as a vendor 12b of a specific product/service and therefore have information 14 available to other members 20 as passive pair relationships 12). The system 26 can use the user role definitions/parameters 18b as well as any defined roles 12b as set up by the first member 20 to provide for both active and passive exchanges of information 14 between the first and second members 20. For example, in the case where the first member 10 is a general physician and the second member 10 is a vendor for office medical supplies, the system 26 would use the user role/profile 12a of general physician and the defined vendor role 12b to inform the first member 20 of the second member 20 as a potential supplier/vendor 12b of medical supplies and the second member 20 of the first member 20 as a potential customer 12a of their vendor role 12b. The mappings between potential role pairs 12 (i.e. customer 12a with vendor 12b) as well as for accepted pairs 12 can be monitored/maintained by the relationship matrix 15, as further described below.

Therefore, providing members 20 control over the connection types (relationship role pair(s) 12) they have with other members 20 provides they feel secure in that defined relationship 12. It is recognized that the relationship administration system 26 can have one or more default role pairs 12 that can be assigned to nonmembers 20 trying to communicate 14 with one or more members/nonmembers 20 via the system 26. For example, each nonmember 20 can be recognized as having a public role profile 12a when trying to communicate via the system 26 with other members/nonmembers 20, who will also be associated with a public role profile 12a for facilitating communications 14 via the system 26 with the non-member 20.

Example definitions of the various roles 12a,b available in the plurality of relationship pairs 12 is as follows. Associate is a person who shares actively in anything as a business, enterprise, or undertaking as a partner or fellow worker. Colleague is a fellow member of a profession, staff, or academic faculty. Friend is a person attached to another by feelings of affection or personal regard and is a person who gives assistance as a patron/supporter. Teacher is a person who teaches or instructs, as a profession as an instructor. Coworker is a fellow worker. Vendor is a person or agency that sells products/services. Customer is a person who purchases goods or services from another as a buyer/patron. Student is a person formally engaged in learning, especially one enrolled in a school or college as a pupil. Manager is a person who has control or direction of an institution, business, etc., or of a part, division, or phase of it. "Co" (e.g. co-manager, co-vender, etc.) is a fellow person with potentially the same business/personal duties as another person. Delegate is a person designated to act for or represent another or others, for example as a deputy/representative. Patient is a person who is under medical care or treatment. Provider is a person or thing that provides a service (e.g. healthcare related) to another person or thing.

Directional Relationship roles 12a,b

•It is recognised that the relationship pairings 12 can be non-directional and/or directional relationship roles 12a,b and associated non-directional and/or directional relationship features/capabilities 180. For example, if two members 20 are in a customer-vendor relationship pair 12, it is possible for those members 20 to engage in another customer-vendor relationship pair 20. In the first relationship pair 12, member M1 may be the vendor and member M2 may be the customer, while in the second relationship pair, member M1 may be the customer, and member M2 may be the vendor. In this case, M1 would only be enabled for the first relationship pair 12 for directional outgoing vendor interactions 14 (i.e. to customer) and incoming vendor interactions 14 (e.g. from customer) in terms of the available features/capabilities 18b for a vendor 12b. As well, M1 would only be enabled for the second relationship pair 12 for directional outgoing customer interactions 14 (i.e. to vendor) and incoming customer interactions 14 (e.g. from vendor) in terms of the available features/capabilities 18b for a customer 12a, for example. Further, M2 would only be enabled for the first relationship pair 12 for directional outgoing customer interactions 14 (i.e. to vendor) and incoming customer interactions 14 (e.g. from vendor) in terms of the available features/capabilities 18b for a customer 12a. As well, M2 would only be enabled for the second relationship pair 12 for directional outgoing vendor interactions 14 (i.e. to customer) and incoming vendor interactions 14 (e.g. from customer) in terms of the available features/capabilities 18b for a vendor 12b, for example.

Another way to think about it is that relationship pairs can be optionally directional, from one role 12a,b to the other. Therefore, the capabilities and features 18a,b between two members 20 may not be the same, because the direction of the relationship pair 12 matters. For example, in a Customer to Vendor relationship pair 12, one member 20 must always be the Customer role 12a while the other member 20 must always be the Vendor role 12b. In this case, there is one Customer-Vendor relationship pair 12, but two separate Relationship Roles 12a,b in that relationship pair 12: one Customer and one Vendor. This is talking to the fact that two people 20 can have to customer-vendor relationships 12, one in each direction, but that they can have different features/capabilities 18a,b because the users 20 may customize how the accept/broadcast those features 18a,b.

Therefore, it is recognised that each relationship pair 12 provides capabilities 18a,b to the members 20. The relationship matrix 15 is in contact with the Relationship Gate 150, to maintain an understanding of the roles 12a,b and relationship pair(s) 12 in affect at any point in time between members 20.

Active/Passive Relationship Pairs 12

Each relationship between a pair of members 20 (e.g. member with member, member with non-member, or non-member with non-member) can consist of one or more relationship pairs 12 (e.g. a first role 12a of the pair 12 is assigned to one member 20 of the member pair and an associated/complimentary second role 12b of the pair 12 is assigned to the other member 20 of the member pair). It is recognized that there can be both passive (one of the roles 12a,b of the pair 12 has not been formally accepted by one of the members 20 of the member pair 12) and active relationships in the system 26 (i.e. both of the roles 12a,b of the pair 12 have been recognized and accepted by each member 20 of the member pair 12—e.g. a first member 20 of the member pair 12 registers with the administration system 26 in one of the roles 12a of the pair 12 and the second member 20 of the member pair 12 formally accepts a role invitation 14 from the first member 20 for the other role 12b of the pair 12, as defined by the administration system 26).

Figure 7:
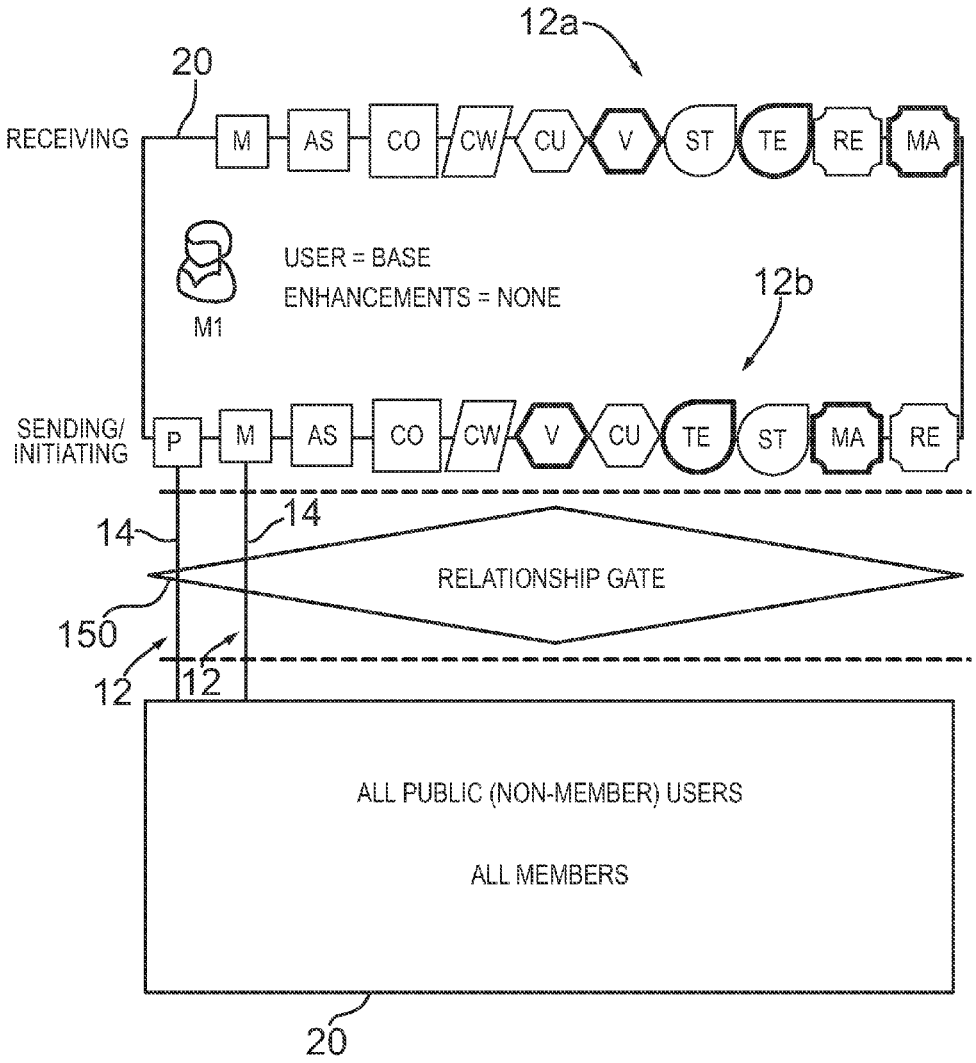
FIG. 7 shows an example relationship gate of the system of FIG. 3.

Referring to FIGS. 1 and 7, there are two types of Relationship pairs 12: Activated/Active Relationships 12 and Inherent/Passive Relationships 12. Inherent relationships 12 can exist without the member 20 or members 20 having to do anything specific to engage or activate the relationship 12 between one or more members 20 accessible by the member via the administration system 26 (e.g. via the relationship gate 150). For example, a relationship pair request 14 from a first member 20 does not have to be received from and accepted by a second member 20, in order to establish the inherent relationship pairing 12 and (and optional associate roles 12a,b) between two or more members 20. The relationship pair 12 is automatically put in place by the administration system 26 when specific member 20 actions 14 occur that would enable the use of their inherent optional relationship role(s) 12a,b and assigned features 18a,b or as their shared features 18 of the relationship pair 12. FIG. 7 shows how the two inherent relationships 12 are always on.

Some inherent relationship pairs 12 include: a) Member (M) to Public (P) (which exists between any member 20 and any non-member 20; b) Member (M) to Member (M) (which exists between every member 20; and c) Family Health Team mate (FHT) to Family Health Team (FHT) mate (which exists between all members 20 of a specific family health team;

Further, activated Relationship pairs 12 are started by one of the members 20 who wants to engage in the selected relationship pair 12. To start an active relationship pair 12, one member 20 Initiates a Handshake (request 14 to enter into the relationship pair 12) to a selected other member 20 of the administration system 26. By executing 14 the Handshake by the other member 20, the other member 20 activates the requested relationship pair 12 and therefore the requesting member assumes the role 12a and the accepting member 20 assumes the role 12b of the relationship pair 12 with the associated features/capabilities 18a,b associated with their roes 12a,b.

It is recognised that Most relationships can be Activated Relationship pairs 12, including a plurality of relationship pair 12 types such as but not limited to: Friend (F) to Friend (F); Associate (As) to Associate (As); Colleague (Co) to Colleague (Co); Coworker (Cw) to Coworker (Cw); Customer (Cu) to Vendor (V)/Vendor (V) to Customer (Cu); Student (St) to Teacher (Te)/Teacher (Te) to Student (St); Report (Re) to Manager (Mg)/Manager (Mg) to Report (Re); Delegate (Dte) to Delegator (Dtr)/Delegator (Dtr) to Delegate (Dte); CoVender to CoVender (CV); CoTeacher to CoTeacher (CT); CoManger to CoManager (CM); and Patient (Pat) to Provider (Pro)/Provider (Pro) to Patient (Pat), as shown in FIG. 7 as example roles 12a,b.

Therefore, when two members (assume M1 and M2) are in a relationship pair 12 with each other, there are Passive and/or Active relationship interactions 14 that may take place within the features/capabilities 18a,b (optimally associated with the roles 12a,b) of the relationship pair 12 of the members M1,M2. For example, Active Interactions 14 can be triggered by an action 14 taken by member M1 or M2, such as active interactions but not limited to: Vendors request to 'view available time' and see the available flex calls of their Customers; Vendors booking available time for a call, since only vendors can book available time; and a member 20 changing their contact information (e.g. mobile phone number), such that this change is then shared with all of his Colleagues. In terms of passive interactions 14, these can happen without member M1 or M2 triggering the specific interaction. Examples of passive interactions 14 are such as but not limited to: the capability for assuming M1 and M2 are colleagues; and a third member (M3) to see who M1 is and that they are connected as colleagues to M2.

In an active exchange 14, there are connecting cooperative features 18a,b between the members 20. Every feature 18a,b can have an entry way and an exit way. In an active exchange 14, the relationship role 12a of the Initiator 20 must be such that the feature 18a can 'Fit' to allow the initiation of the exchange 14 (e.g. create and send meeting request), and the relationship role 12b of the Receiver 20 must be such that the cooperative feature 18b will Fit the receiving end (e.g. receive and accept/decline meeting request) of the exchange 14.

It is recognised that whether or not a relationship pair 12 can exist, is available to start, and/or is maintained, etc, with respect to the members 20 of the administration system 26 is coordinated the Relationship Gate 150, further described below.

The Relationship Gate 150

Figure 9:
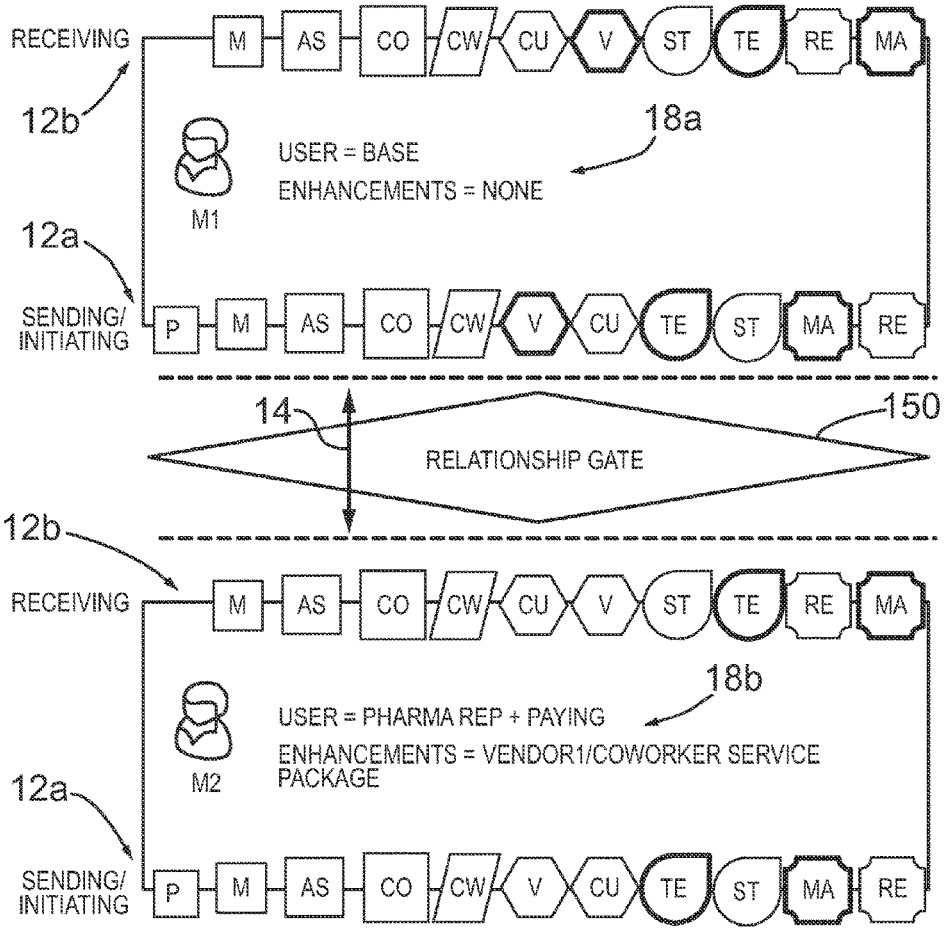
FIG. 9 is a further embodiment of the gate of FIG. 8.

Referring to FIGS. 1 and 9, sending of interactions 14 (e.g. messages, emails, or viewing, or other network 11 enabled communications) does not always require that the member 20 be in an active relationship pair 12, as in the case where the profile 9 of the member 20 is being viewed by a non-member 20.

The Relationship Gate 150 is used by the administration system 26 to provide for allowed interactions 14 (e.g. in type, content and/or format) between any members 20 over the network 11. The relationship gate 150 has access to the relationship matrix 15 (see FIG. 8) that stores all the available roles 12a,b and/or corresponding features 18a,b to a respective member 20 (e.g. for example in the case of a non-member 24, the administration system 26 can assign a default role(s) 120 and corresponding feature(s) 18a,b). The relationship gate 150 can be used to restrict the transmission via the network 11 of any generated interactions 14 that do not match with the sender member 20 and/or receiver member 20 assigned roles 12a,b and/or features 18a,b (shared or not). Alternatively, or in addition to, the relationship gate 150 can be used to restrict the generation of any interactions 14 that do not match with the sender member 20 and/or receiver member 20 assigned roles 12a,b and/or features 18a,b (shared or not).

For example, the member 20 may generate a vendor-based communication 14 and then try to send the vendor-based communication 14 to a non-customer of the member 20, for which the relationship gate 150 would review the roles 12a,b and/or features 18a,b (shared or not) of the non-customer member 20, determine that the vendor-based communication 14 is inappropriate for the non-customer member 20 and then block or otherwise inform (e.g. using a message that informs the role 12a,b incompatibility of the non-customer member 20 with a suggestion of sending an invitation instead to enter into a vendor-customer relationship role 12 with the member 20) the vendor member 20 of the inability to transmit the vendor-based communication 14. In this situation, the relationship gate 150 could also modify and/or suggest (to the sending member 20) modifications to the vendor-based communication 14 to include a customer role 12b invitation for sending to the non-customer member 20. In an alternative embodiment, the relationship gate 150 could block the member 20 from generating a message 14 that is not consistent (e.g. in terms of message type, content, and/or format) with any of their current roles 12a,b and/or features 18a,b (shared or not). For example, the member 20 may want to generate a solicitation email for a new product line being sold by the vendor member 20, however the product line and materials associated therewith (e.g. invoices, ordering forms, brochures, etc.) may not be enabled in the roles 12a,b and/or features 18a,b (shared or not) of the member 20 in the matrix 15. The relationship gate 150 could respond to the member 20 to inform the member of the roles 12a,b and/or features 18a,b lacking in their account 9, which needed in order to be able to generate the desired new product line message 14. For example, maybe the member's account 9 needs to be upgraded for multiple product line vendor status before the new product line can be a subject of communications by the member 20.

Accordingly, the relationship gate 150 is used by the administration system 26 to check whether any relationship pair 12, associated roles 12a,b, and/or features 18a,b (shared or not) are in place, may be enabled, or are to be disabled, in order to facilitate the interactions 14 desired by any of the members 20 with respect to other selected members 20 of the system 26. If, at any time, two members 20 are in a relationship pair 12 where the relationship pair becomes unavailable or either relationship role 12a,b becomes unavailable to one of the members 20, then the relationship pair 12 can become cancelled from the matrix 15. For example, one of the members 20 of the relationship pair 20 can leave the administration system 26, thereby cancelling their account 9. In this case, all of the relationship pairs 12 with this member 20 would be cancelled and all of the corresponding relation roles 12a,b would be deleted or otherwise treated as inactive in the matrix by the administration system 26. It is recognised that the relationship gate 150 could be used to update the matrix 15 for changes in roles 12a,b, and/or features 18a,b (shared or not), as desired.

Referring again to FIG. 9, or example, for Member 1 (M1) to be a customer 12a and Member 2 (M2) to be a Vendor 12b: 1. M1 is able to be a Customer 12a; 2. M2 is able to be a Vendor 12b; 3. M1 does not have any Relationship pair 12 Restrictions 18a preventing them from initiating (or maintaining) a Relationship pair where they are the Customer 12a; 4. M2 does not have any Relationship Restrictions 18b preventing them from initiating (or maintaining) a Relationship pair where they are the Vendor 12b; 5. M1 does not have any Organization Restrictions 18a preventing them from being a Customer 12a; 6. M2 does not have any Organization Restrictions 18b preventing them from being a Vendor 12b; 7. M1 and M2 do not (in a Customer to Vendor relationship) work 18a,b at the same Organisation; 8. M1 is not in any relationship pairs 12 that would restrict or prevent them from initiating or maintaining a Customer to Vendor relationship pair and being the Customer 12a; 9. M2 is not in any relationship pairs 12 that would restrict or prevent them from initiating or maintaining a Customer to Vendor relationship 12 and being the Vendor 12b, for example Relationship count limits 18a,b fall in here since a member 20 cannot initiate a new relationship pair 12 of a specific type if he or she has already used up all the availability of that relationship pair type 12).

Further to the above, it is recognised that features 18a,b of a particular role 12a,b can contribute to revenue generation and enhanced relationships possible with differentiated relationship pairs 12 having uniquely characterizing role(s) 12a,b and associated features 18a,b (as compared to other different role(s) 12a,b, in relationship pairs 12), such that the healthcare providers (or other industry specific members 20) can comfortably connect with both their colleagues and their vendors. Members 20 may have to pay to be able to be engage in specific relationship pairs 12 and/or to gain desired features 18a,b (e.g. feature enhancements) for their selected roles 12a,b. For example, a service package that a member 20 purchases from the administration system 26 may restrict/enable 18a,b not only the types of relationship roles 12a,b the member 20 can be, but the number of times 18a,b the member 20 can engage in a relationship pair 12 where they are playing that role 120). For example, the administration system 26 may charge marketing professionals 20 a marketing charge (e.g. $100/month) to be able to be 18a,b a Vendor in customer-vendor relationship pair 12. Further, the $100 package may only allow 18a,b the member 20 to have limited number (e.g. 50) customer-vendor relationship pairs 12 where they are the Vendor 12a, while an increased value ($200/month) package may allow 18a,b more/additional/increased (e.g. 200) customer-vendor relationship pairs 12, for example.

Handshake Example

Figure 10:
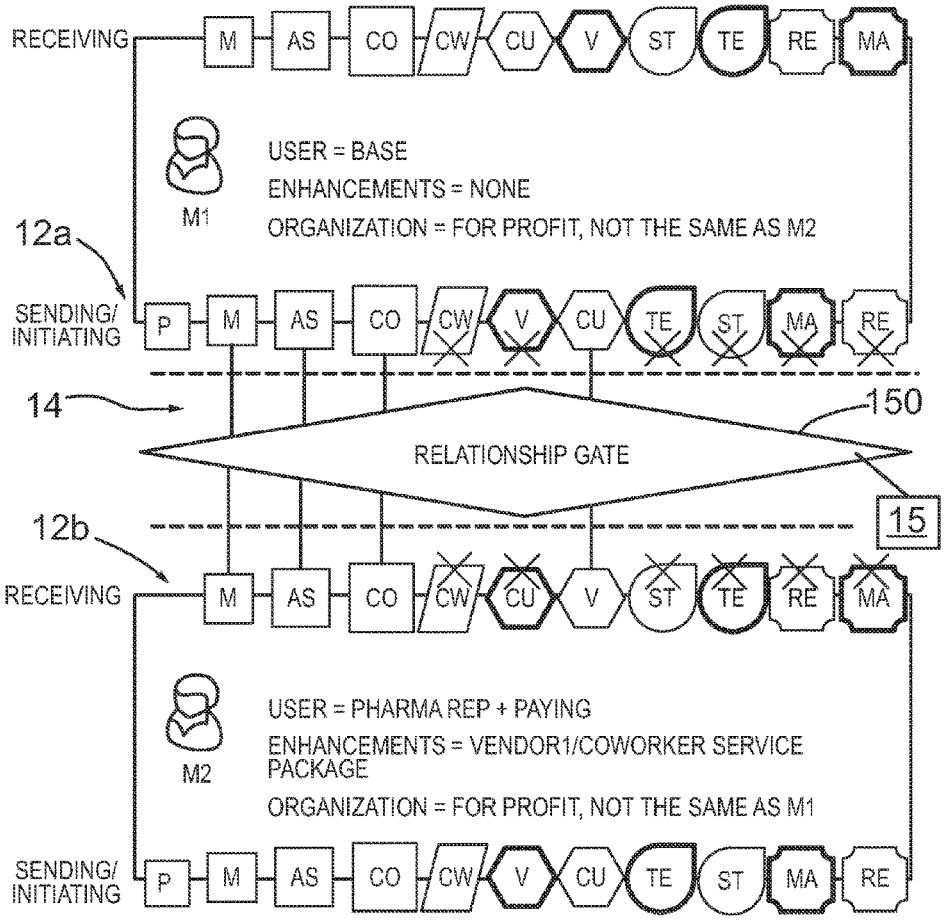
FIG. 10 is an example operation of the gate of FIG. 9.

Referring to FIGS. 1, 9, and 10, in Relationship Creation or Handshaking, e.g. for active relationship pairs 12, there is a Sender M1 (or Initiator) and a Receiver M2. The Relationship Gate 150 decides, based on matrix data 15 for sender/receiver members 20, whether or not a relationship pair 12 is already in place, may be enabled, or is to be disabled. There matrix defined factor(s) (e.g. matrix data 15 of the relationships including optional role 12a,b and/or feature 18a,b (shared or not) for the members 20) that impact whether a member 20 can or cannot initiate a relationship and play a specific relationship 12 with another member 20, such as but not limited to: 1. the Sender Ml capability to be in the specific Relationship Role 12a; 2. the Receiver M2 capability to be in the specific Relationship Role 12b; 3. if Sender M1 has any Relationship pair 12 Restrictions 18a and/or Relationship Enhancements 18a (which for example can be provided via paid for service packages, organization affiliation, member affiliations, etc.); 4. if Receiver M2 has any Relationship Restrictions 18 band/or Relationship Enhancements 18b; 5. the Type of Organization the Sender M1 works with; 6. the Type of Organization the Receiver M2 works with; 7. whether or not the Sender M1 and Receiver M2 work at the same organization; 8. whether or not the Sender M1 shares a relationship pair 12 with any other member (e.g. M3) that would restrict the sender M1 being able to enter into this relationship pair 12; and/or 9, whether or not the Receiver M2 shares a relationship pair 12 with any other member (e.g. M3) that would restrict the receiver M2 being able to enter into this relationship pair 12.

Referring again to FIG. 10, assume Member M1 wishes to initiate a relationship pair 12 with Member M2, such that they have not activated any relationships previously. The Member to Public (P) is always active, but is superseded in this exchange by the Member to Member 'Port' 150a (such that the relationship gate 150 can have a number of ports 150a open and/or operable for the members 20 depending upon their roles 12a,b and/or features 18a,b. The Member to Member (M) Port is engaged between any two members 20. Assume the matrix 15 has data 15 that is compatible with the potential initiation invitations 14 for the potential relationship pairs 12 displayed in FIG. 10. In reviewing the relationship roles that sender M1 can initiate with M2, •Associate (As) 12a,b is available; Colleague (Co) 12a,b is available; Co Worker (CW) 12a,b is unavailable with M2 because they are not at the same organisation 18a,b; Vendor (V) 12a,b is unavailable with anyone; Customer (Cu) 12a,b is available with M2 who can be a Vendor 12a,b; Teacher (Te) 12a,b is unavailable with anyone; Student (St) 12a,b is unavailable with M2 because M2 cannot be a Teacher to anyone: Manager (Ma) 12a,b is unavailable with anyone; and Report (Re) 12a,b is unavailable with M2 because M2 cannot be a Manager to anyone.

Relationship Banding

Figure 11:
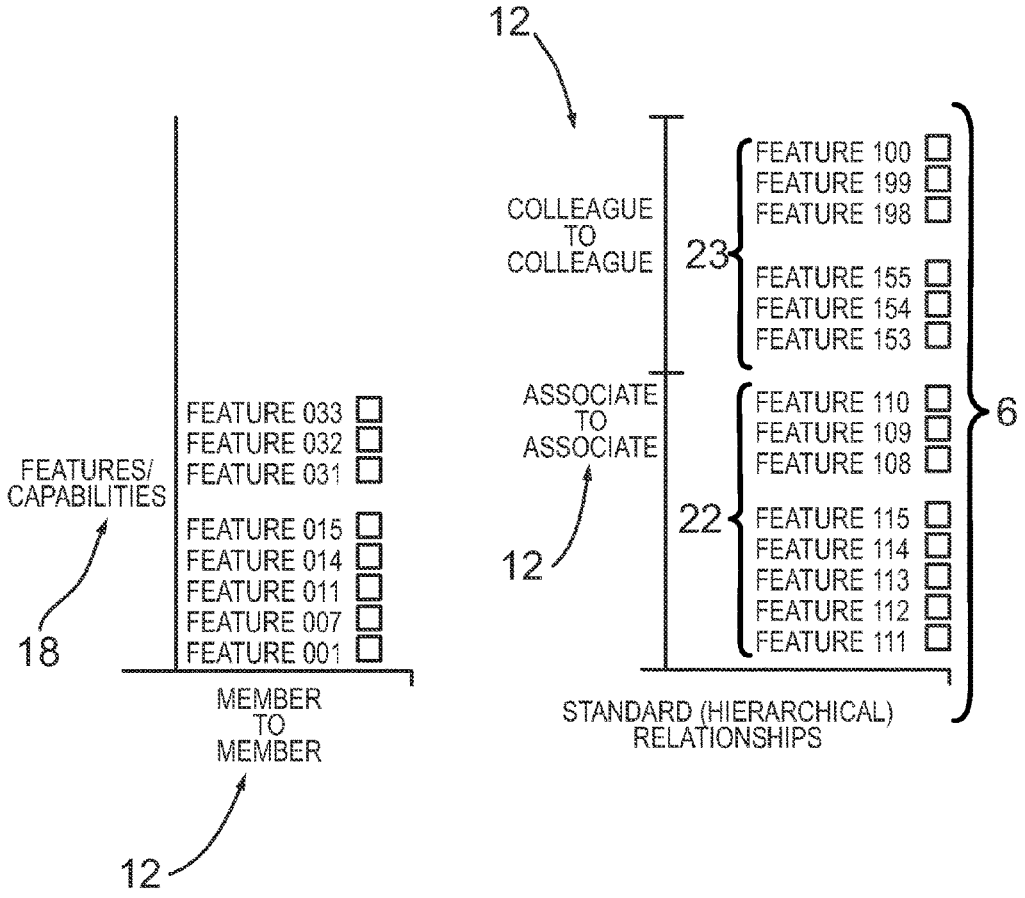
FIG. 11 is an example of banding of the relationships of FIG. 1.

Referring to FIGS. 1 and 11, the features and capabilities 18 (shared or not) associated with each relationship pairing 12 has a specific number of defined features 18 as part of a minimum boundary/band feature set 22,23 (e.g. combined) for each of the relationship pair 12 types (i.e. the features 18 in the minimum boundary/band feature set 22,23 must remain enabled by the members 20 if they are to remain in the accepted relationship 12 selected/established between them. For example, the relationship pair 12 type "Associate to Associate" has a minimum band feature set 22 of F108 to F115 and the "Colleague to Colleague" has a minimum band feature set 23 of F100,F198,F199,F153 to F155. The members 20 in the "Associate to Associate" relationship pair 12 know that each of the members 20 has these minimum number of features 18 in their minimum band feature set 22 for the respective relationship pair 12 type, in order to maintain transparency and trust about the relationship pair 12 the members 20 created between each other (i.e. representative of what it means to be in the relationship 12 characterized as associate to associate).

In the event that the relationship 12 between the members 20 evolves to include a second enriched relationship pair 12 (e.g. Colleague to Colleague), which builds upon the first relationship pair 12 (e.g. associate to associate), the administration system 26 manages that additional features of a respective minimum boundary/band feature set 23 for the second relationship pair 12 are added to the now aggregate relationship 6, while providing that the first minimum boundary/band feature set 22 is maintained by the members 20 in the aggregate relationship pair 6 (i.e. characterizing the combination of the associate to associate and colleague to colleague relationships). In this manner, the members 20 in the aggregate relationship pair 6 understand that the aggregate relationship pair 6 is characterized by at least the features 18 contained in both minimum boundary/band feature sets 22,23.

Also in FIG. 9, it is shown that when in just a "member to member" public relationship pair 12, the minimum boundary/band feature set 25 is F001, F007, F011, F014, F015 and F031-F033, such that these features 18 are all superseded (i.e. replaced, substituted) when the relationship pair 12 evolves to the associate to associate and the colleague to colleague. In other words, the relationship features 18 for associate to associate completely supersede those for the member to member relationship pair 12. It is recognised that the banded features 18 can be optionally part of the individual roles 12a,b of the relationship pair 12, as desired.

Accordingly, relationships of the same name (e.g. relationship pair 12 type), as defined by the administration system 26, always have minimum boundary/band feature sets 22, even when they are being used by different members 20. This minimum number of features 18 enforced in the relationship pair 12 provides for that all members 20 understand what a colleague is, and what a vendor is, and what a customer is, for example. Though there can be some flexibility in relationship pairs 12, meaning that members 20 can have some control as to how much information (e.g. enabled features 18) they have in a specific relationship pair 12 type, the minimum boundary/band feature sets 22 provide that no one member can deviate too far from those respective minimum features 18 of the relationship pair 12. For example, one member 20 as a colleague role 12a,b cannot have the same features 18 and information sharing capabilities 180 as another member 20 as a vendor role 12a,b, otherwise relationship roles 12a,b would cease to have any meaning in the context of different relationship pair 12 types having different features 18a,b.

One embodiment of the defined roles 12a,b provides for the banding of the features/capabilities 18a,b, such that progression from one lesser role to the next greater role between any member pair 12 (e.g. from friend to colleague) provides for a minimum number of the features/capabilities 18a,b of the lesser role 120 to be included as default features (e.g. part of the minimum boundary/band feature sets 22) for the greater role 12a,b. This banding provides for members 20 to truly represent their accepted role 12a,b when interacting with the other members 20 of the member pair 12 using the assigned defined role 12a,b. For example, a member 20 who has accepted another member 20 as a friend cannot simply turn off access 18 to the other member 20 from their contact information (e.g. phone number, email address, home address, etc.) that appropriately represents the friend role 12a,b. It is understood that to be an accepted friend, some member information (and any other appropriate features/capabilities 18) cannot be restricted from the other member 20 of the member pair 12 on an adhoc basis. In other words, turning off or otherwise disabling of features 18 from the minimum boundary/band feature set(s) 22 would cause the stated relationship pair 6,12 to lose the understood (by the members 20) role 12a,b characteristics inherent in the relationship pair 6,12 assigned to the members 20. It is also understood that the evolution of the minimum boundary/band feature sets 22 for aggregate relationship pairs 6 can be hierarchical in assignment.

Referring again to FIG. 8, the capabilities/features/privileges/restrictions 18 are grouped as associated/assigned to the respective individual relationship role 12a,b. It is recognised that the sets/groups 22,23 of assigned features 18 can have some individual features 18 in common (e.g. overlapping sets/groups 22,23 of features 18), however each set/group 22,23 of features 18 as a whole is unique in feature 18 content to the respective role type 12a that they are assigned. In this manner, the administration system 26 can facilitate that a role 12 type has a unique first set 22 of assigned features 18 and therefore cannot be confused with a second role 12 type having a unique second set 23 of assigned features 18, such that the first 22 and second set 22 of features 18 are not identical. For example, the role type 12a of a Colleague would have different set 23 of features 18 than that of an Associate, as would the aggregate role 8 of associate+colleague (see FIG. 9) would have an aggregate set 22+23 of features 18

It is also recognised that some features 18 can be superseded by other features 18, either in whole or in part (e.g. to take the place of such as replace or to augment so as to make an already assigned feature 18 greater/lesser in size, extent, or influence), during aggregation of relationship pairs 12 and their corresponding roles 12a,b and features sets 22,23, as further described below with respect to aggregate relationship pairs 6 (see FIG. 9).

As an alternative embodiment to relationships 12 and banding, it is also recognised that the defined online existing relationship 12 between a first member 20 and a second member 20 can be defined by a plurality of existing relationship features 18 for use in managing network interaction 14 on the communications network 11 between the first member 20 and the second member 20. The relationship features 18 are characteristic of the relationship 12, such that at least one of the corresponding relationship features 18 of the relationship 12 is used to define as permitted at least one of the network interaction 14 type, the network interaction content, or the network interaction format. It is recognised that the relationship features 18 can be between the first member 20 and the second member 20 (i.e. each of the members 20 do not have a defined relationship role 12a,b, in the relationship 12). Or, as further discussed above, it is recognised that a first portion of the relationship features 18a characterizes the first relationship role 12a and a second portion of the relationship features 18b characterizes the second relationship role 12b, such that the first relationship role 12a and the second relationship role 12b are part of the relationship defined as the relationship pair 12 between the first and second members 20. In other words, the aggregate relationship pair 12, described above by example only, can be administered by the administration system 26 as a role less relationship 12, such that the relationship features 18 are shared between the members 20 for managing their inter-member 20 interactions 14.

Relationship Aggregation

Figure 12A:
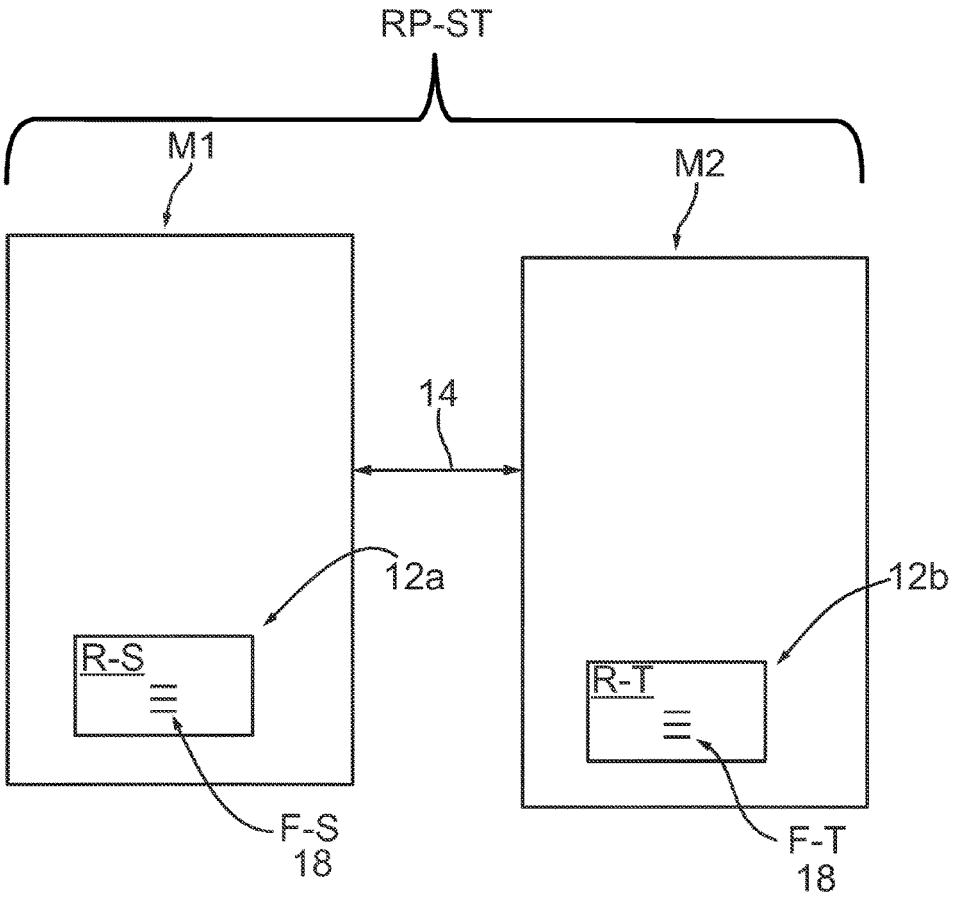
FIG. 12a is a further embodiment of the relationships of FIG. 1.

Referring to FIGS. 1 and 12a,b, the relationship pairs 12 and the associated roles 12a that are assigned to a respective member 20 by the administration system 26 can change over time, as the online relationship the member 20 has with other members 20 also grows/changes/evolves over time. Flexibility in relationship 12 evolution management is facilitated by the ability of the administration system 26 to aggregate relationship pairs 12. Members 20 may not always have the same relationship with each other over time, and therefore the administration system 26 provides the environment for member relationships to alter, grow, and/or diminish in their relationship characteristics (e.g. relationship roles 12a,b and associated features 18a,b and interaction 14 abilities.

Therefore, relationships 12 and optional relationship roles 12a,b can change, as coordinated by the administration system 26, and in changing some relationship features 18 and/or roles 12a,b can supersede (either in whole or in part) one another. For example, two members 20 could be paired 12 as Associates but then become closer and decide to become paired 12 as Colleagues. In becoming colleagues, their associate relationship 12 could be superseded because all of the features and capabilities 18 of the Associate relationship 12 could be within the Colleague relationship 12.

Further, individual relationships 12 and the corresponding relationship roles 12a,b need to be able to grow, in order to provide for desired richer (e.g. additional feature 18 supported) interaction(s) 14 between the members 20 of the evolving/growing relationship 12. One mechanism provided by the administration system 26 to support the evolution of relationships is the coordination of aggregate relationship pairs 6 that can involve multiple relationship sub-pairs 12. For example, two members 20 could be in a colleague-colleague relationship pair 12, but also want to engage in a customer-vendor relationship pair 12 as well as a student-vendor relationship pair 12. The administration system 26 facilitates the management of the associated roles 12a,b as an aggregate role 8 and the associated features set 18 as an aggregate feature set 4 by enabling individual relationship pairs 12 that have different features and capabilities 18 to aggregate.

An example of relationship evolution between members 20 is Joe Smith M1 goes to University to be a Doctor. While at University, the teachers have decided to use a valuable medical industry social CRM network—administration system 26—to work with their students 20. One of Joe's M1 professors is Dr. Jones M2. Joe M1 connects with Dr. Jones M2 on the administration system 26 in a Student-Teacher relationship pair RP-ST. Joe M1 gels his residency at Toronto General, as shown in FIG. 12a. He leaves university to start his new full time position. In leaving school, the system 26 asks him to confirm that his relationship pair RP-ST (as Student to Teacher) be cancelled or changed, shown deleted by stippled lines for R-T,F-T and R-S,F-S in FIG. 12b.

Figure 12B:
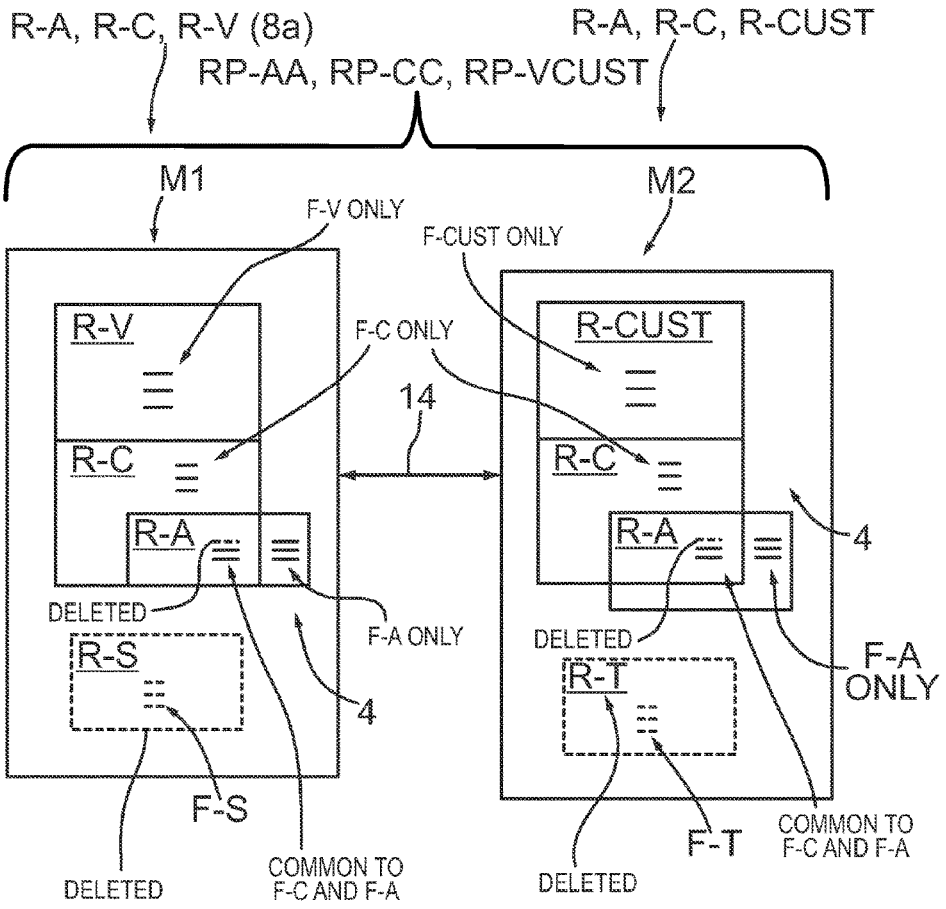

Next, the final result of relationship evolution is shown in FIG. 12b, where first Joe M1 requests, via a handshake 14, that Dr. Jones 20 accept new relationship pair RP-AA—an Associate to Associate. Joe M1 is now a physician at Toronto General, and he meets Dr. Jones M2 one day in the hall as Dr. Jones M2 is now performing many consultations at the hospital. They M1,M2 end up being able to become closer, and are now colleagues. They change their administration system 26 via interactions 14 with one another to reflect this, i.e. to add a colleague to colleague pair RP-CC. Joe M1 decides he is no longer interested in working with the providers, and interviews with AstraZeneca to work with their medical department. They accept that, and he moves to AZ. He keeps his Colleague to Colleague relationship pair RP-CC with Dr. Jones M2, but now also requests 14 that Dr. Jones M2 accept him as a Vendor for AV products, thus further evolving their relationship in the administration system 26 to add a vendor-customer relationship pair RP-VCust.

In view of the above example, it is recognised that the individual relationship pairs RP-AA, RP-VCust, RP-CC are aggregated to define the corresponding aggregate relationship pair 6 (an aggregation of the different individual relationship pairs 12) between the members M1,M2. Further, it is recognised that the corresponding aggregate role 8 is an aggregated combination of the individually defined roles 12a,b (e.g. role R-A, R-A, R-V, R-Cust, R-C, R-C) of each of the individual relationship pairs RP-AA, RP-VC, RP-CC, and the corresponding aggregate features/capabilities 4 is an aggregated combination of the individually defined features/capabilities 180 (e.g. features/capabilities C-A,C-A, C-V,C-Cust, C-C, C-C) of each of the individual relationship roles 12a,b. In other words, the administration system 26 provides for defined interactions 14 between any paired members 20 based on their aggregate features/capabilities 4 as defined via their corresponding aggregate role 8. For example, Joe M1 interacts 14 with Dr. Jones M2 in their aggregate relationship pair 6 using any of the aggregate features/capabilities 18. In view of the defined interactions 14 facilitated by the system 26 via the relationship gate 150 (see FIG. 7), either of the members M1,M2 can recognise what individual role 12a,b (and/or combined role 12a,b) available in the aggregate role 8 that the member M1,M2 is using during the interactions 14, as any of the aggregate features/capabilities 4 can retain and/or combine their individual defined characteristic features/capabilities 18 characteristics represented in the interactions 14.

Further, in view of the above, it is recognised that certain feature(s) 18 can be such as but not limited to: unique (e.g. only provided) by a particular role 12a,b and therefore become additions/deletions to/from the existing/aggregate features 4 when the roles 12a,b are aggregated (i.e. when a new role 12a,b is added to existing role(s) 12a,b or aggregate role 8 and/or existing role(s) 12a,b is/are deleted/removed from the existing aggregate role 8 (or existing single role 12a,b); can overlap (e.g. be in common) between two or more roles 12a,b and therefore become redundant aggregate feature(s) 4 when the roles 12a,b are aggregated; can be conflicting with other existing features 18 of the set of aggregate features 4 and therefore the new and/or existing features 18 can be disabled/deleted from the aggregate features 4 when the roles 12a,b are aggregated; can supersede or be superseded (e.g. either the new or existing feature is a preferred feature 18) over existing/new feature(s) 18 in the aggregate features 4 and therefore the non-preferred features new and/or existing features 18 can be disabled/deleted from the aggregate features 4; or a combination thereof.

Further, it is recognised that the process of aggregation performed by the administration system 26 for example, to result in the aggregate relationship pair 6 and associated optional aggregate role 8 and assigned aggregate features 4, can be defined by such as but not limited to: the combining of a selected (e.g. by the member 20 and/or requested 14 by another member 20) new optional role 12a,b to an existing relationship role 12a,b or to two or more existing roles 12a,b (e.g. to an existing aggregate role 8) of a relationship pair 12,6; the deleting of a selected role 12a,b from two or more existing roles 12a,b (e.g. to an existing aggregate role 8) of a relationship pair 6; and/or the amendment of an existing relationship role 12a,b or of at least one of two or more existing roles 12a,b (e.g. to an existing aggregate role 8) of a relationship pair 12,6 through the combining with selected new role(s) 12a,b and/or an existing aggregated role 8.

It is recognised that the content (e.g. text, image, video, enclosures, message type (email, telephone, text message, etc.), message enclosures, content size/amount/length) and/or format (e.g. form of the content such as colour, font style, message priority, etc.) of the interactions 14 can be defined by and their generation facilitated by the associated features/capabilities 18a,b (e.g. of the optional role 12a,b or as shared by the members 20 of the pair 12) that the member 20 is using/operating under in the administration system 26 with selected (active and/or passive) other members 20. It is also recognised that the content and/or form of the interactions 14 can be defined using a combination of different roles 12a,b and their associated features 18a,b in view of aggregation of relationship pairs 12. Therefore, the aggregate features 4 of the aggregate role 8 can cooperate together and/or separately, as selected by the respective member 20 to generate 14 and/or to respond/reply 14 to communications over the network 14 between member(s) 20 that are part of the member aggregate relationship pair 4 governed by the aggregate roles 8a,b assigned to the members 20 of the aggregate relationship pair 4.

For example, when Joe M1 asks 14 Dr. Jones M2 to dinner, the characteristics (e.g. text, image content and/or format) of the interaction 14 can be defined by the particular features/capabilities 18 Joe M1 is using from his aggregate role 8 of the aggregate relationship pair 6 with Dr. Jones M2. For instance, Joe M1 can send an email 14 to Dr. Jones M2 requesting a meeting at a corresponding time and place. Based on the use of certain individual role(s) 12a,b in the aggregate role 8, by Joe M1, when generating the email 14, Joe M1 can affect the perceived tone (e.g. business, personal, or a combination thereof) of the email 14 by selecting certain features/capabilities 18a,b associated with selected roles 12a,b of his aggregated role 8 with Dr. Jones M2. For example, Joe M1 can select in communication with interaction 14 building capabilities of the administration system 26 (e.g. via browser as a thin client of the administration system 26 as a Web service), and/or via an administration system module/application 27 installed on his device 101, see FIG. 2, (e.g. as a thick client of the administration system 26), the particular roles R-V,R-C and therefore have available all of the content/format features C-V,C-C to generate the email 14. In this case, Joe M1 can include in the email 14 vendor details (via the selected individual capabilities C-V of the selected individual role R-V) of his products with marketing and/or order materials (as email enclosures) and can also have the email 14 type formatted (via the selected individual capabilities C-C of the selected individual role R-C in the role 8) to be perceived as a colleague meeting invitation. This would provide for Dr. Jones M2 to understand that the proposed meeting will be a combination of business and personal interaction between them, e.g. a soft sell environment with potential for extended interaction in the colleague context. On the contrary, Joe M1 can include in the email 14 only vendor details (via the selected individual capabilities C-V of the selected individual role R-V in the role 8) of his products with marketing and/or order materials (as email enclosures) with corresponding formatting (via the selected individual capabilities C-C of the selected individual role R-C in the role 8). This would provide for Dr. Jones M2 to understand that the proposed meeting will be a strictly business interaction between them, e.g. a harder sell environment with little/no time for extended interaction in other role 12a,b contexts of the aggregate role 8 of the aggregate relationship 6. It is recognised that both Dr. Jones M2 and Joe M1 are cognizant of the extents (i.e. list of possible individual roles 12a,b and associated individual features 18a,b) of their aggregate relationship pair 6.

As well, further to the above example, Dr. Jones M2 can also include in his response communication 14 (e.g. email and/or telephone call) the appropriate type of response as dictated by the individual role(s) 12a,b used to generate the original email 14. For example, in the strict business sense, the relationship gate 150 may disallow return communication 14 (to the email 14) in the form of a telephone call, as this would not be available as a feature/capability 18 in a customer role R-Cust in response to received product solicitation emails 14 (i.e. Joe M1 only used his role R-V to generate the email 14). On the other hand, in the event where Joe M1 used his role R-V to generate the email 14 along with his role R-C as part of his aggregate role 8, the relationship gate 150 could allow Dr. Jones M2 to informally reply 14 to the original email 14 using a telephone call 14 as part of the features C-C afforded by Dr. Jones M2 role R-C of his respective aggregate role 8.

In view of FIGS. 1 and 12a,b and the above evolution example, it is recognised that aggregation of relationship pair 12 types (i.e. any member 20 assuming the roles 12a and associated features/capabilities 18a of a plurality of relationship pair types 12) can be used to represent electronically the definition of the Aggregate relationship role 8 for a member 20, representing the composite/aggregation of individually defined roles 12a,b that a member 20 has between two or more other members 20 of the administration system 26. Accordingly, the Aggregate relationship role 8 provides for any member 20 to evolve their aggregated relationship pairs 12 over time as an assembly/combination of separate parts/portions of features/capabilities 18a defined for a number of respective different defined relationship roles 12a of a number of different relationship pair 12 types. It is recognised that the roles 12a,b as part of the aggregate relationship role 8 can affect the growth and/or shrinkage in size and/or effect of the capabilities, features, and restrictions 18 associated with each overall aggregate relationship 12 (i.e. a combination/aggregation of different relationship pairs 12) between pairs of members 20. Therefore, the provision and coordination of aggregate relationship pairs 6 by the administration system 26 between pairs of members 20 can provide for incremental increase/decrease in the size and/or effect of the associated roles 12a,b, and corresponding features/capabilities 18a,b as a collection from separate/individual defined roles 12a,b and corresponding features/capabilities 18a,b aggregated within the aggregate relationship pair 6.

As an alternative embodiment, it is also recognised that the defined online existing relationship 12 between a first member 20 and a second member 20 can be defined by a plurality of existing relationship features 18 for use in managing network interaction 14 on the communications network 11 between the first member 20 and the second member 20. The relationship features 18 are characteristic of the relationship 12, such that at least one of the corresponding relationship features 18 of the relationship 12 is used to define as permitted at least one of the network interaction 14 type, the network interaction content, or the network interaction format. It is recognised that the relationship features 18 can be between the first member 20 and the second member 20 (i.e. each of the members 20 do not have a defined relationship role 12a,b, in the relationship 12). Or, as further discussed above, it is recognised that a first portion of the relationship features 18a characterizes the first relationship role 12a and a second portion of the relationship features 18b characterizes the second relationship role 12b, such that the first relationship role 12a and the second relationship role 12b are part of the relationship defined as the relationship pair 12 between the first and second members 20. In other words, the aggregate relationship pair 12, described above by example only, can be administered by the administration system 26 as a role less relationship 12, such that the relationship features 18 are shared between the members 20 for managing their inter-member 20 interactions 14.

Relationship Engine of the Administration System 26

Figure 13:
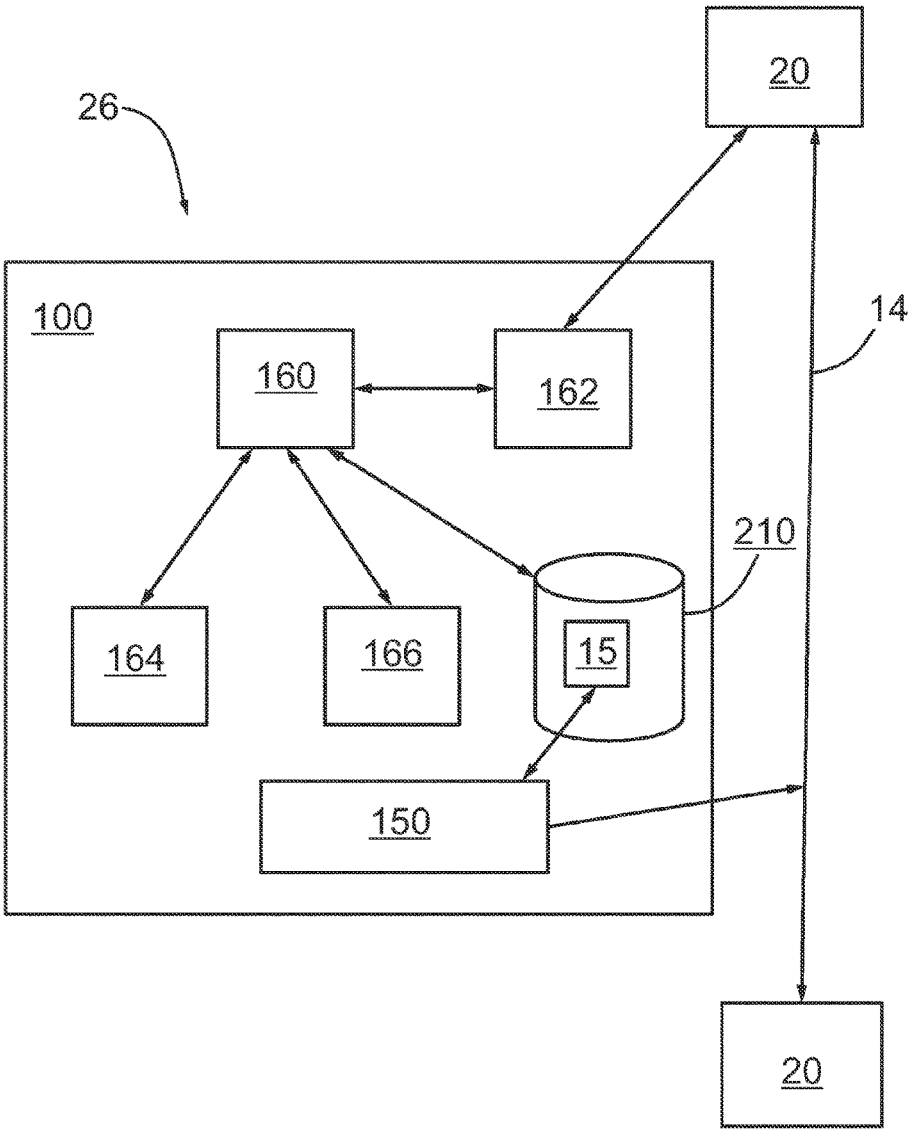
FIG. 13 shows an example configuration of the administration system of FIG. 1.
Figure 14:
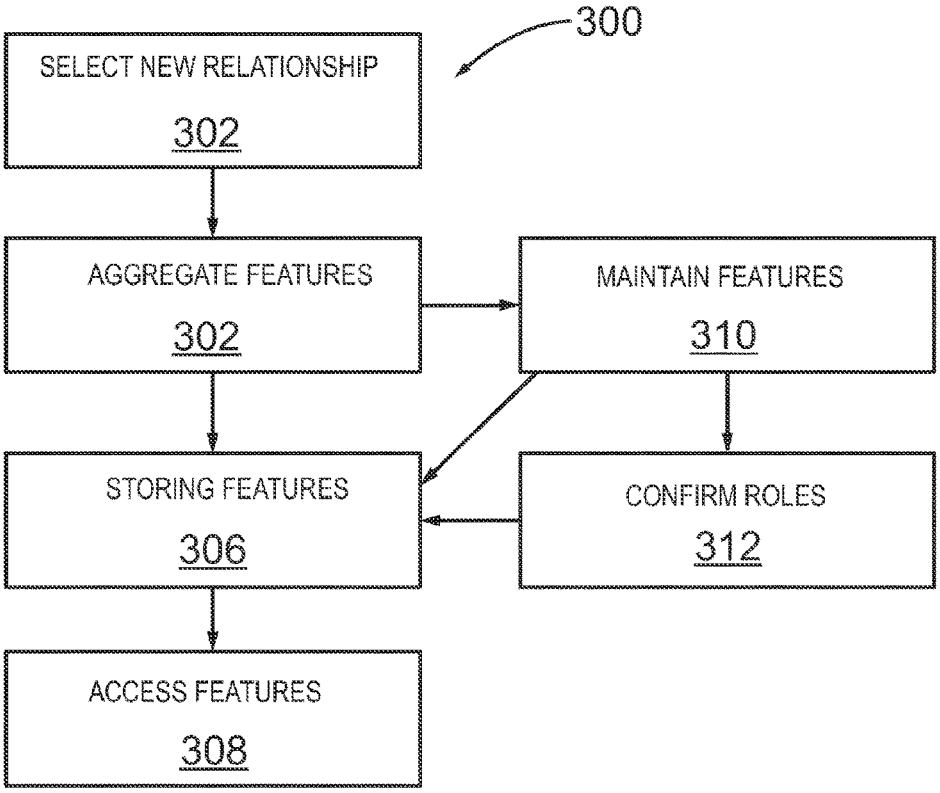
FIG. 14 shows an example operation of the administration system of FIG. 13.

Referring to FIGS. 1 and 13, shown is a relationship network environment 10 for facilitating communications 14 between members and nonmembers 20,24 (e.g. using a computing device 101—see FIG. 2) via the relationship administration system 26. Relationship data 15 is maintained by a relationship engine 100 of the system 26 for one or more pairs 12 defined for a pair of the members/nonmembers 20,24. The mode, format, and/or information content of the communications 14 between the members/nonmembers 20,24 may be monitored or otherwise structured by the relationship administration system 26 in view of the particular features/capabilities defined in the relationship data 15 of the pair(s) 12 defined for the member pair. The relationship engine 100 provides for initializing, maintaining, and modifying the defined pair(s) 12 associated with a selected pair of the members 20, as well as managing the interactions 14 based on the data 15.

For example, evolving a defined online existing relationship 12 between a first member 20 and a second member 20 is performed by the engine 100, such that the online existing relationship 12 is defined by a plurality of existing relationship features 18 for use in managing network interaction 14 on a communications network II between the first member 20 and the second member 20. The engine 100 facilitates receiving by a selection module 162 a new online relationship 12 (for example submitted by one of the members 20) having new relationship features 18, such that the new features 18 are different from the existing relationship features 18. The new relationship features 18 are characteristic of the new relationship 12. The engine 100 aggregates the existing relationship features 18 (and optionally for the aggregate role 8 by aggregating the new and existing roles 12a,b) and the new relationship features 18 by an aggregation module 160 as aggregate relationship features 4, which are a combination of the existing relationship features 18 and the new relationship features 18, in order to define the aggregate relationship 6. The engine 100 stores the aggregate relationship features 4 in a storage 210 of the administration system 26 as relationship data 15 representing the aggregate relationship 6 defined by the relationship features 4 for example by the aggregator module 160.

A further optional operation is by clone a banding module 164 for defining a minimum number (e.g. sets 22,23) of aggregate features 4 of the aggregate relationship 6 that must be maintained, as discussed above. A further optional operation is by a role module 166 for defining the aggregate role 8a,b for each of the members 20 of the aggregate relationship 6 that is confirmed by the member (s) 20. It is also recognised that the role module 166 can be used to define any directional and inherent/passive nature of the roles 8a,b.

Further, the engine 100 has the relationship gate module 150 configured for accessing the relationship data 15 in order to determine whether a selected network interaction 14 from one of the members 20 is permitted in view of at least one of the corresponding aggregate relationship features 4 of the aggregate relationship 6. The relationship gate module 150 also facilitates the selected network interaction 14 between the members 20 when determined as permitted, such that the at least one of the corresponding aggregate relationship features 4 of the aggregate relationship 6 is used to define as permitted at least one of the network interaction 14 type, the network interaction content, or the network interaction format.

It is also recognized that multimember pairings 12 could be implemented by the system 26, for example where each of a plurality of members is paired to a respective member (e.g. a many to one pairing) or a respective member is paired to a plurality of members (e.g. a one to many pairing). This type of pairing provides for the setup of group settings, such as a plurality of customers that are serviced by a vendor, a plurality of vendors that are selected to service a particular customer, a manager that has a number of employees, etc. In this manner, communications 14 between the members in group settings can be performed in parallel, such that an offer from one vendor can be communicated 14 simultaneously to the each of the plurality of customers associated with the vendor, via the respective defined vendor customer role pairs 12 between the vendor and each of the customers of the plurality of customers of the system 26. Also, in the case of multiple vendors for a particular customer, each of the vendors could be made aware (via the system 26) of an offer proposed by one of the vendors to the customer (e.g. in a open bid process in a Request for Proposal situation). Further, it is also recognized that a many to many member group can be set up, such as in the case of a group of friends, a group of colleagues, etc. In this manner, communications 14 sent to one of the members of the group would be communicated to each of the other members of the group.

However, in each of the above multimember pairing examples, there can exists defined role 12a,b between any two member pair of the plurality of members 20, i.e. in the colleague group example, each of the members of the group would have a colleague-colleague defined role 12a,b with each of the other members of the group. A further embodiment is where there is a relationship defined as a three (or more) person "pairing" such that there are three or more roles 12a,b,c, with associated features/capabilities 18a,b,c to define the complete set of interactions 14 between the multi-person "pairing" 12. In this manner, each of the members of the multi-person pairing (also know as a member set) has a subset of the total features/capabilities 18a,b,c (some features/capabilities 18a,b,c can be overlapping between the members of the member set. For example, a relationship member set of a teacher, a tutor, and a student can be implemented in the system 26, such that each member of the member set is connected to each other as defined by the individual relationship roles defined in their relationship data 15. For example, the teacher, tutor, student combination could contain the individual pairings 12 of student-teacher, teacher-student, student-tutor, tutor-student, teacher-tutor, and tutor-teacher, such that each of the roles 12a,b,c of the member set pairing 12 would have the associated features/capabilities 18a,b,c. For example, the tutor and the teacher could share 14 exam results and other evaluation criteria/comments of the student (which are blocked 14 from view from the student), the tutor could receive and respond 14 to laboratory questions from the student, however these questions would not be communicated 14 to the teacher until first reviewed/commented on by the tutor, etc.

In the manner as discussed above by example, the format, content, mode, and other features/capabilities of the communications 14 (including information visible on the Web page/profile page 11 of the member account) between members is monitored and/or otherwise maintained/structured by the system 26.

The following is a list, for example only, of the configuration of the relationship data 15 between any pair of members of the system 26:

- Users choose relationships (i.e. pair(s) 12) to have with another users;
- Some relationships are aggregated/combined/Some are hierarchical;
- Relationships can be removed/downgraded/upgraded;
- A relationship connection can use two one way connections 120, e.g. the vendor has a vendor customer connection 12a with the customer and the customer has a customer—vendor connection 12b with the vendor). Therefore, the user offering any relationship uses a complimentary relationship in reverse. So to be in a relationship, the other user accepts the complimentary relationship to have back. To accommodate the creation of 'two relationships', each user adopts a relationship role 12a,b in any two way relationship 12 (also would apply in member sets having more than two members);
- Relationships are impacted by time, and can require checks/changes/upgrades/downgrades/etc;
- Events may trigger relationship checks/changes;
- User roles may impact relationship;
- User relationships with other users/organizations may impact potential for relationships with another user;
- User may alter, within limits, relationship permissions by customizing the available customizable features/capabilities of the defined role pairing 12. (There can be minimum permissions and maximum permissions associated with each relationship, so as to maintain a band of commonality with each relationship so users become used to what it means to be involved in that relationship.);
- Capability to start/maintain a relationship may be impacted by:
  - User role of Initiator
  - User role of Receiver
  - Service package of Initiator
  - Service package or Receiver
  - Organization Environment of Initiator
  - Organization Environment of Receiver;
- Connections or "pipes" (e.g. one-way connection of the two way relationship) may be used to transfer information/features;
- Some "pipes" may be active. Some may be passive; and
- Some relationship pipes are always in place, depending on the user role. (For example, a base user always has 'Public' pipes in place displaying a limited amount of information to the public).

Operation of the System 26

Referring to FIGS. 1, 12b, 13, and 14, a method 300 for evolving a defined online existing relationship 12 between a first member 20 and a second member 20 is provided, such that the online existing relationship 12 is defined by a plurality of existing relationship features 18 for use in managing network interaction 14 on a communications network 11 between the first member 20 and the second member 20. The method 300 comprises the steps of: step 302 receiving by the selection module 162 a new online relationship 12 having new relationship features 18 such that the new features 18 are different from the existing relationship features 18, the new relationship features 18 being characteristic of the new relationship 12; step 304 aggregating the existing relationship features 18 (and optionally for the aggregate role 8) and the new relationship features 18 by the aggregation module 160 as aggregate relationship features 4 as a combination of the existing relationship features 18 and the new relationship features 18 in order to define an aggregate relationship 6; step 306 storing the aggregate relationship features 4 in a storage 210 of the administration system 26 as relationship data 15 representing the aggregate relationship 6 defined by the relationship features 4; and step 308 of accessing the relationship data 15 by the relationship gate 150 in order to determine whether a selected network interaction 14 from one of the members 20 is permitted in view of at least one of the corresponding aggregate relationship features 4 of the aggregate relationship 6 and facilitating the selected network interaction 14 between the members 20 when determined as permitted, such that the at least one of the corresponding aggregate relationship features 4 of the aggregate relationship 6 is used to define as permitted at least one of the network interaction 14 type, the network interaction content, or the network interaction format.

A further optional step 310 is by a banding module 164 for defining a minimum number of features 4 of the relationship 6 that must be maintained. A further optional step 312 is by a role module 166 for defining the aggregate role 8a,b for each of the members 20 of the relationship 6 that must be confirmed by the member (s) 20. It is also recognised that the role module 166 can be used to define any directional and inherent/passive nature of the roles 8a,b.

Computing Devices 101

Figure 2:
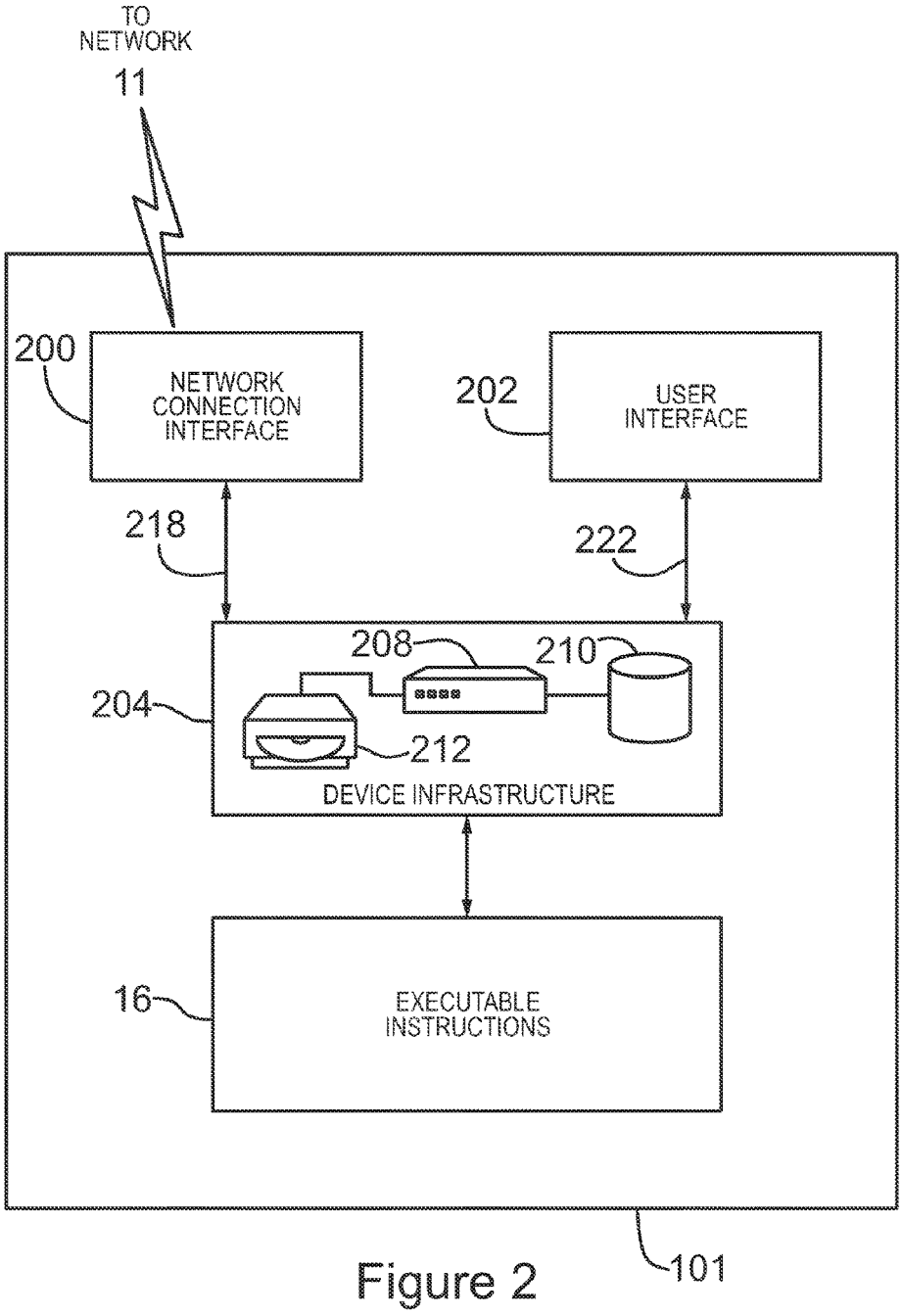
FIG. 2 shows a block diagram of an example computing device for implementing components of the system of FIG. 1.

Referring to FIGS. 1 and 2, each of the above-described members 20 and administration systems 26 can be implemented on one or more respective computing device(s) 101. The devices 101 in general can include a network connection interface 200, such as a network interface card or a modem, coupled via connection 218 to a device infrastructure 204. The connection interface 200 is connectable during operation of the devices 101 to the network 11 (e.g. an intranet and/or an extranet such as the Internet), which enables the devices 101 to communicate with each other as appropriate. The network 11 supports the communication 14 of the data between the administration system 26 and members 20, and also supports the communication 14 of the data between the members 20.

Referring again to FIG. 2, the devices 101 can also have a user interface 202, coupled to the device infrastructure 204 by connection 222, to interact with a user (e.g. vendor 20, customer 20, nonmember 20, etc.). The user interface 202 can include one or more user input devices such as but not limited to a QWERTY keyboard, a keypad, a track wheel, a stylus, a mouse, a microphone and the user output device such as an LCD screen display and/or a speaker. If the screen is touch sensitive, then the display can also be used as the user input device as controlled by the device infrastructure 204. For example, the user interface 202 for the devices 101 used by the members 20 can be configured to interact with the members 20 web browsers (applications 16) to access 14 the member information 15 available on the websites/accounts 9 of the members 20. For the devices 101 used by the members 20,e user interfaces 202 can be used to access the administration system 26 (e.g. via a website) to register with the system 26 (i.e. set up/modify their account) as well as to provide information for display on their account 9. For the devices 101 used by the administration system 26 (e.g. using the relationship engine 100), the user interfaces 202 can be used to the administration to configure the relationship data 1 of member pairing(s) 12 based on information and/or registration data of the members 20.

Referring again to FIG. 2, operation or the device 101 is facilitated by the device infrastructure 204. The device infrastructure 204 includes one or more computer processors 208 and can include an associated memory 210 (e.g. a random access memory) for storing of relationship data 15 and for processing communications 14 communicated between the members 20 and between the administration system 26 and the members 20. The computer processor 208 facilitates performance of the device 101 configured for the intended task (e.g. members 20, administration system 26) through operation of the network interface 200, the user interface 202 and other application programs/hardware 16 of the device 101 by executing task related instructions. These task related instructions can be provided by an operating system, and/or software applications 16 located in the memory 210, and/or by operability that is configured into the electronic/digital circuitry of the processor(s) 208 designed to perform the specific task(s). Further, it is recognized that the device infrastructure 204 can include a computer readable storage medium 212 coupled to the processor 208 for providing instructions to the processor 208 and/or to load/update client applications 16. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination. For example, the applications 16 can include browsers used by the members 20 to access the Web site of the administration system 26 and/or to communicate 14 information between members 20 of the system 26

Further, it is recognized that the computing devices 101 can include the executable applications 16 comprising code or machine readable instructions for implementing predetermined functions/operations including those of an operating system, relationship configuration system(s), for example, in response to user command or input. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality (e.g. engine 100) provided by the systems and process of FIGS. 1,2,3 may be implemented in hardware, software or a combination of both. Accordingly, the use of a processor 208 as a device and/or as a set of machine readable instructions is hereafter referred to generically as a processor/module for sake of simplicity. Further, it is recognized that the administration system 26 can include one or more of the computing devices 301 (comprising hardware and/or software) for implementing the engine 100, as desired.

It will be understood that the member 20 client computing devices 101 may be, for example, personal computers, personal digital assistants, mobile phones, and content players. Server computing devices 101 (e.g. for the administration system 26 and/or the member 20) may additionally include a secondary storage element such as the memory (e.g. database). Each server, although depicted as a single computer system, may be implemented as a network of computer processors, as desired.

I claim:

1. A *computer-implemented* method for evolving, *at a relationship administration system,* a defined online existing relationship between a first member and a second member, the online existing relationship defined by a plurality of existing relationship features for use in managing network interaction on a communications network between the first member and the second member, the method comprising the steps of:

receiving a new online relationship having new relationship features such that the new *relationship* features are different from the existing relationship features, the new relationship features being characteristic of the new relationship;

aggregating the existing relationship features and the new relationship features as aggregate relationship features by combining the existing relationship features and the new relationship features in order to define an aggregate relationship;

storing the aggregate relationship features in a storage as relationship data *in a relationship matrix* representing the aggregate relationship defined by the aggregate relationship features, *the aggregate relationship features comprising of aggregate first role features of the first member and aggregate second role features of the second member, the aggregate first role features being different from the aggregate second role features in that the aggregate first role features define at least one of message content, or message type as permitted by the first member in a first network message while the aggregate second role features omit or otherwise deny said at least one of the message content or message type from a second network message by the second member*; and accessing the *relationship matrix to obtain the* relationship data in order to determine whether [a selected network message initiated by the first member for communication over the communications network for receipt by the second member is permitted in view of at least one of the corresponding aggregate relationship features of the aggregate relationship, and either allowing or denying] *to allow or deny* the [selected] *second* network message [to be] communicated over the communications network from the [first] *second* member [to the second member] based on the relationship data, *the second message having said at least one of the message content or message type as a presentation on a user interface of the first member*;

wherein said at least one of the corresponding aggregate relationship features of the aggregate relationship is used to define at least one of message type, message content, [or] *and* message format of the [selected] *first* network message *and the second network message*.

2. The method of claim 1, wherein the aggregate relationship features are shared between the first member and the second member.

3. The method of claim 2, wherein a first portion of the aggregate relationship features is assigned to a first aggregate relationship role of the aggregate relationship for the first member and a second portion of the aggregate relationship features is assigned to a second aggregate relationship role of the aggregate relationship for the second member.

4. The method of claim 3, wherein the first aggregate relationship role and the second aggregate relationship role are different, such that the first portion of the aggregate relationship features characterizes the first aggregate relationship role and the second portion of the aggregate relationship features characterizes the second aggregate relationship role, such that the first aggregate relationship role and the second aggregate relationship role are part of the aggregate relationship defined as an aggregate relationship pair between the first and second members.

5. A *computer-implemented* method for evolving, *at a relationship administration system,* a defined online existing relationship pair between a first member and a second member, the online existing relationship pair defined by a first existing relationship role assigned to the first member having a plurality of first existing role features for use in managing network interaction on a communications network between the first member and the second member, and a second existing relationship role assigned to the second member having a plurality of second existing role features for use in managing the network interaction between the first member and the second member, the method comprising the steps of:

receiving a new online relationship pair having a first new relationship role and a second new relationship role, such that corresponding first new role features of the first new relationship role and the second new role features of the second new relationship role are different from the first existing role features and the second existing role features, the first new role features and the second new role features being characteristic of the new relationship pair;

aggregating the first existing role features and the first new role features as aggregate first role features by combining the first existing role features and the first new role features in order to define a first aggregate role;

aggregating the second existing role features and the second new role features as second aggregate role features by combining the second existing role features and the second new role features in order to define a second aggregate role;

storing the first aggregate role and the second aggregate role with their associated aggregate features in a storage as relationship data *in a relationship matrix* representing an aggregate relationship pair defined by the first and second aggregate roles and their corresponding aggregate role features, *the aggregate first role features being different from the aggregate second role features in that the aggregate first role features define at least one of message content or message type as permitted by the first member in a first network message while the aggregate second role features omit or otherwise deny said at least one of the message content or message type from a second network message by the second member*; and accessing the *relationship matrix to obtain the* relationship data in order to determine whether a [selected network message initiated by the first member for communication over the communications network for receipt by the second member is permitted in view of at least one of the first or second aggregate roles or their associated aggregate role features of at least one of the first aggregate role or the second aggregate role of the aggregate relationship pair, and either allowing or denying] *to allow or deny* the [selected] *second* network message [to be] communicated over the communications network from the first member [to the second member] based on the relationship data, *the second message having said at least one of the message content or message type as a presentation on a user interface of the first member*;

wherein said at least one of the corresponding aggregate role or aggregate role features of at least one of the first aggregate role or the second aggregate role of the aggregate relationship pair is used to define at least one of message type, message content, [or] *and* message format of the [selected] *first* network message *and the second network message*.

6. The method of claim 5, wherein the step of aggregating the first existing and first new role features involves the addition of a new feature from the first new role features to the first existing role features.

7. The method of claim 5, wherein the step of aggregating the first existing and first new role features involves the deletion of an existing feature from the existing role features.

8. The method of claim 5, wherein the step of aggregating the first existing and first new role features involves the substitution of a new feature from the first new role features exchange an existing feature of the existing role features.

9. The method of claim 6, wherein the network message includes a network action associated with a profile of at least one of the first member or the second member.

10. The method of claim 6 further comprising the step of defining a minimum number of the first existing role features to remain as part of the first aggregate role features.

11. The method of claim 10 further comprising the step of defining a minimum number of the first new role features to become part of the first aggregate role features.

12. The method of claim 10 further comprising the step of defining in [the] *said* relationship data that the aggregate relationship pair is an active relationship pair that requires formal acceptance by the second member of the second new relationship role.

13. The method of claim 10 further comprising the step of defining in [the] *said* relationship data that the aggregate relationship pair is a passive relationship pair that does not require formal acceptance by the second member of the second new relationship role.

14. The method of claim 10 further comprising the step of defining the first new relationship role and the second new relationship role as directional roles, such that the first member must assume the first new relationship role in order for the second member to assume the second new relationship role.

15. The method of claim 14, wherein the first new role features and the second new role features are different from one another.

16. The method of claim 6 further comprising the step of defining in [the] *said* relationship data that the aggregate relationship pair is an active relationship pair that requires formal acceptance by the second member of the second new relationship role.

17. The method of claim 6 further comprising the step of defining in [the] *said* relationship data that the aggregate relationship pair is a passive relationship pair that does not require formal acceptance by the second member of the second new relationship role.

18. The method of claim 10 further comprising the step of defining the first new relationship role and the second new relationship role as directional roles, such that the first member must assume the first new relationship role in order for the second member to assume the second new relationship role.

19. The method of claim 18, wherein the first new role features and the second new role features are different from one another.

20. A *computer-implement* method for evolving, *at a relationship administration system,* a defined online existing relationship pair between a first member and a second member, the online existing relationship pair defined by a plurality of existing relationship features for use in managing network interaction on a communications network between the first member and the second member, the method comprising the steps of:

receiving a new online relationship pair having corresponding new relationship features different from the existing relationship features, the new relationship features *such that* being characteristic of the new relationship pair;

combining the existing relationship features and the new relationship features to generate combined relationship features by adding a new feature from the new relationship features to the existing relationship features, such that a minimum number of the existing relationship features remain as part of the combined relationship features, *the combined relationship features comprising combined first role features of the first member and combined second role features of the second member*;

storing the combined relationship features in a storage as relationship data *in a relationship matrix* representing the new relationship pair for the first and second members defined by the corresponding respective combined relationship features, *the combined first role features being different from the combined second role features in that the combined first role features define at least one of message content or message type as permitted by the first member in a first network message while the combine second role features omit or otherwise deny said at least one of the message content or message type from a second network message by the second member*; and accessing the *relationship matrix to obtain the* relationship data in order to determine whether [a selected network message initiated by the first member for communication over the communications network for receipt by the second member is permitted in view of at least one of the corresponding combined relationship features, and either allowing or denying] *to allow or deny* the [selected] *second* network message [to be] communicated over the communications network from the [first] *second* member [to the second member] based on the relationship data, *the second message having said at least one of the message content or message type as a presentation on a user interface of the first member*;

wherein at least one of the corresponding combined relationship features of the new relationship pair is used to define at least one of message type, message content, [or] *and* message format of the [selected] *first* network message *and the second network message*.

21. A *computer-implemented* method for evolving, *at a relationship administration system,* a defined online existing relationship pair between a first member and a second member, the online existing relationship pair defined by a first existing relationship role assigned to the first member having a plurality of first existing role features for use in managing network interaction on a communications network between the first member and the second member, and a second existing relationship role assigned to the second member having a plurality of second existing role features for use in managing the network interaction between the first member and the second member, the method comprising the steps of:

receiving a new online relationship pair having *a* corresponding first new role features and second new role features different from the first existing role features and second existing role features, the first new role features and second new role features being characteristic of the new relationship pair;

combining the first existing role features and the first new role features to generate [first] combined *first* role features by adding a new feature from the first new role features to the first existing role features, such that a minimum number of the first existing role features remain as part of the [first] combined *first* role features;

combining the second existing role features and the second new role features to generate [second] combined *second* role features by adding a new feature from the second new role features to the second existing role features, such that a minimum number of the second existing role features remain as part of the [second] combined *second* role features;

storing the first and second combined role features in a storage as relationship data *in a relationship matrix* representing the new relationship pair for the first and second members defined by the corresponding respective first and second combined role features, *the combined first role features being different from the combined second role features in that the combined first role features define at least one of message content or message type as permitted by the first member in a first network message while the combine second role features omit or otherwise deny said at least one of the message content or message type from a second network message by the second member*; and accessing the *relationship matrix to obtain the* relationship data in order to determine whether [a selected network message initiated by the first member for communication over the communications network for receipt by the second member is permitted in view of at least one of the corresponding first or second combined role features, and either allowing or denying] *to allow or deny* the [selected] *second network* message [to be] communicated over the communications network from the [first] *second* member [to the second member] based on the relationship data, *the second message having said at least one of the message content or message type as a presentation on a user interface of the first member*;

wherein at least one of the corresponding first or second combined role features of the new relationship pair is used to define at least one of message type, message content, [or] *and* message format of the [selected] *first* network message *and the second network message*.

22. The method of claim 21 further comprising the step of defining a minimum number of the first new role features to become part of the first combined role features.

23. The method of claim 21 further comprising the step of defining a minimum number of the second new role features to become part of the second combined role features.

24. A *computer implemented* method for defining, *at a relationship administration system,* an online relationship pair between a first member and a second member, the relationship pair including a first relationship role assigned to the first member having a plurality of first role features for use in managing network interaction on a communications network between the first member and the second member, and a second relationship role assigned to the second member having a plurality of second role features for use in managing the network interaction between the first member and the second member, the method comprising the steps of:

assigning the first relationship role to the first member such that the first role features are characteristic of the first relationship role;

assigning the second relationship role to the second member such that the second role features are characteristic of the second relationship role, such that the second member must confirm the second relationship role in order for the first member to be able to use the first relationship role in the network interaction between the first and second members;

storing the first relationship role and the second relationship role with their associated role features in a storage as relationship data *in a relationship matrix* representing the relationship pair, *the first role features being different from the second role features in that the first role features define at least one of message content, or message type as permitted by the first member in a first network message while the second role features omits or otherwise denies said at least one of the message content or message type from a second network message by the second member*; and accessing the *relationship matrix to obtain the* relationship data in order to determine whether [a selected network message initiated by the first member for communication over the communications network for receipt by the second member is permitted in view of at least one of the corresponding relationship roles or role features of at least one of the first relationship role or second relationship role of the relationship pair, and either allowing or denying] *to allow or deny* the [selected] *second* network message [to be] communicated over the communications network from the [first] *second* member [to the second member] based on the relationship data, *the second message having said at least one of the message content or message type as a presentation on a user interface of the first member*;

wherein said at least one of the corresponding first or second relationship roles or role features of at least one of the first relationship role or the second relationship role of the relationship pair is used to define at least one of message type, message content, [or] *and* message format of the [selected] *first* network message *and the second network message*.

*25. A computer-implemented method for deciding, at a relationship administration system, an online relationship pair between a first member and a second member, the method comprising the steps of:*

*informing a first relationship role of the online relationship pair as a potential to the first member, the first relationship role comprising a plurality of first role features;*

*receiving confirmation of the first relationship role;*

*informing a second relationship role of the online relationship pair as a potential to the second member, the second relationship role comprising a plurality of second role features;*

*storing the first relationship role and the second relationship role between the first member and the second member as relationship data in a relationship matrix representing a defined relationship pair, the first role features being different from the second role features in that the first role features define at least one of message content, or message type as permitted by the first member in a first network message by the first member while the second role features omit or otherwise deny said at least one of the message content or message type from a second network message by the second member; and*

*accessing the relationship matrix to obtain the relationship data in order to determine whether to allow or deny the second network message communicated over the communications network from the second member based on said relationship data, the second message having said at least one of the message content or message type as a presentation on a user interface of the first member;*

*said at least one of the corresponding first or second relationship roles or the plurality of first role features or the plurality of second role features of the defined relationship pair is used to define at least one of network interaction type, network interaction content, or network interaction format of the first network message and the second network message.*

*26. The method of claim 25, wherein the defined relationship pair is a new relationship pair.*

*27. The method of claim 25, wherein the relationship pair includes the first relationship role for the first member having a least one first role feature for use in managing network interactions on a communications network between the first member and the second member, and the second relationship role for the second member having at least one second role feature for use in managing the network interactions between the second member and the first member.*

*28. The method of claim 25, wherein the second member confirms the second relationship role.*

*29. A computer-implemented method for defining, at a relationship administration system, a online relationship pair between a first member and a second member, the method comprising the steps of:*

*based on a first relationship role of the online relationship pair for the first member, receiving a second relationship role of the online relationship pair for the second member from the first member, the first relationship role comprising a plurality of first role features and the second relationship role comprising a plurality of second role features;*

*sending the second relationship role of the online relationship pair to the second member;*

*storing the first relationship role and the second relationship role between the first member and the second member as relationship data in a relationship matrix representing a defined relationship pair for coordinating subsequent network interactions between the first member and the second member, the first role features being different from the second role features in that the first role features define at least one of message content, or message type as permitted by the first member in a first network message by the first member while the second role features omit or otherwise deny said at least one of the message content or message type from a second network message by the second member; and*

*accessing the relationship matrix to obtain the relationship data in order to determine whether to allow or deny the second network message communicated over the communications network from the second member based on said relationship data, the second message having said at least one of the message content or message type as a presentation on a user interface of the first member;*

*said at least one of the corresponding first or second relationship roles or the plurality of first role features or the plurality of second role features of the defined relationship pair is used to define at least one of network interaction type, network interaction content, or network interaction format of the first network message and the second network message.*

*30. The method of claim 29, wherein the network interaction is a network message.*

*31. The method of claim 30, wherein the network interaction is initiated by one of the members to the other of the members.*

*32. A computer-implemented method for facilitating, at a relationship administration system, a plurality of different online relationship pairs for selection between a first member and a second member, the method comprising the steps of:*

*providing a first relationship role of a selected online relationship pair for the first member, the first relationship role comprising a plurality of first role features;*

*providing a second relationship role of the selected online relationship pair for the second member, the second relationship role comprising a plurality of second role features;*

*storing the first relationship role and the second relationship role between the first member and the second member as relationship data in a relationship matrix representing a defined relationship pair for coordinating subsequent network interactions between the first member and the second member, the first role features being different from the second role features in that the first role features define at least one of message content, or message type as permitted by the first member in a first network message by the first member while the second relationship role features omit or otherwise deny said at least one of the message content or message type from a second network message by the second member; and*

*accessing the relationship matrix to obtain the relationship data in order to determine whether to allow or deny the second network message communicated over the communications network from the second member based on said relationship data, the second message having said at least one of the message content or message type as a presentation on a user interface of the first member;*

*said at least one of the corresponding first or second relationship roles or the plurality of first role features or the plurality of second role features of the defined relationship pair is used to define at least one of network interaction type, network interaction content,*

*or network interaction format of the first network message and the second network message.*

*33. The method of claim 32, wherein at least one of the first member or the second member is a group of members.*

*34. The method of claim 32, wherein at least one of the first member or the second member is paired to a plurality of members.*

*35. The method of claim 32, wherein the first member is paired to a third member.*

*36. The method of claim 32, wherein the defined relationship pair is impacted by time.*

*37. The method of claim 32, wherein the defined relationship pair is affected by events triggering relationship change.*

*38. The method of claim 37, wherein the defined relationship pair is affected by occurrence of specific member actions.*

*39. The method of claim 32, wherein the first member is a delegate of the second member.*

*40. The method of claim 32, wherein the defined relationship pair is one of an active or a passive relationship.*

*41. The method of claim 25, wherein the defined relationship pair is one of a plurality of different possible relationship pairs between the first member and the second member, one of said plurality of different possible relationship pairs having different online interaction abilities of an interaction relative to another of said plurality of different possible relationship pairs, each of the different online interaction abilities of the interaction defining a corresponding connection option type defining information of the interaction as at least one of visible or sharable between the first member and the second member.*

*42. The method of claim 29, wherein the defined relationship pair is one of a plurality of different possible relationship pairs between the first member and the second member, one of said plurality of different possible relationship pairs having different online interaction abilities of an interaction relative to another of said plurality of different possible relationship pairs, each of the different online interaction abilities of the interaction defining a corresponding connection option type defining information of the interaction as at least one of visible or sharable between the first member and the second member.*

*43. The method of claim 32, wherein the defined relationship pair is one of the plurality of different online relationship pairs between the first member and the second member, one of said plurality of different possible relationship pairs having different online interaction abilities of an interaction relative to another of said plurality of different possible relationship pairs, each of the different online interaction abilities of the interaction defining a corresponding connection option type defining information of the interaction as at least one of visible or sharable between the first member and the second member.*

* * * * *